US012394613B2

(12) United States Patent
Biesenthal et al.

(10) Patent No.: US 12,394,613 B2
(45) Date of Patent: Aug. 19, 2025

(54) THREE STAGE ATMOSPHERE TO VACUUM MASS SPECTROMETER INLET WITH ADDITIONAL DECLUSTERING IN THE THIRD STAGE

(71) Applicant: DH Technologies Development Pte. Ltd., Singapore (SG)

(72) Inventors: Thomas Biesenthal, Caledon (CA); Hassan Javaheri, Richmond Hill (CA); Bradley B. Schneider, Bradford (CA)

(73) Assignee: DH Technologies Development Pte. Ltd., Singapore (SG)

( * ) Notice: Subject to any disclaimer, the term of this patent is extended or adjusted under 35 U.S.C. 154(b) by 302 days.

(21) Appl. No.: 17/913,499

(22) PCT Filed: Mar. 19, 2021

(86) PCT No.: PCT/IB2021/052326

§ 371 (c)(1),
(2) Date: Sep. 22, 2022

(87) PCT Pub. No.: WO2021/191758

PCT Pub. Date: Sep. 30, 2021

(65) Prior Publication Data

US 2023/0118135 A1 Apr. 20, 2023

Related U.S. Application Data

(60) Provisional application No. 62/993,965, filed on Mar. 24, 2020.

(51) Int. Cl.
*H01J 49/06* (2006.01)
*H01J 49/00* (2006.01)
(Continued)

(52) U.S. Cl.
CPC ........ *H01J 49/063* (2013.01); *H01J 49/0045* (2013.01); *H01J 49/022* (2013.01);
(Continued)

(58) Field of Classification Search
CPC .... H01J 49/063; H01J 49/0045; H01J 49/022; H01J 49/065; H01J 49/067; H01J 49/24; H01J 49/005
See application file for complete search history.

(56) References Cited

U.S. PATENT DOCUMENTS 5,432,343 A * 7/1995 Gulcicek ............... H01J 49/067 250/288
5,652,427 A * 7/1997 Whitehouse ........ H01J 49/0481 250/288
(Continued)

FOREIGN PATENT DOCUMENTS

CN 202103011 U 1/2012
EP 1502280 A1 2/2005
EP 2770523 A1 8/2014

OTHER PUBLICATIONS

International Search Report for International Application No. PCT/IB2021/052326 dated Jun. 16, 2021.
(Continued)

*Primary Examiner* — David E Smith
*Assistant Examiner* — Christopher J Gassen
(74) *Attorney, Agent, or Firm* — Potomac Law Group, PLLC; Reza Mollaaghababa; Brian Hairston

(57) ABSTRACT

A mass spectrometer comprises an orifice plate having an orifice, a first multipole ion guide in a first chamber downstream of said orifice plate, said first multipole ion guide comprising a plurality of rods, and a second multipole ion guide in a second chamber downstream of said first chamber, said second multipole ion guide comprising a plurality of rods. A first ion lens is between the first and the second
(Continued)

multipole ion guides. A third multipole ion guide is in a third chamber downstream of the second chamber, the third multipole ion guide comprises a plurality of rods. A second ion lens is between the second and third chambers. A tunable DC voltage source applies a tunable DC offset voltage to at least one of the above ion guide and ion lenses to increase an axial kinetic energy of the ions to cause at least one of declustering and/or fragmentation.

12 Claims, 26 Drawing Sheets

(51) Int. Cl.
*H01J 49/02* (2006.01)
*H01J 49/24* (2006.01)

(52) U.S. Cl.
CPC .......... *H01J 49/065* (2013.01); *H01J 49/067* (2013.01); *H01J 49/24* (2013.01)

(56) References Cited

U.S. PATENT DOCUMENTS 6,121,607 A * 9/2000 Whitehouse .......... H01J 49/063 250/288
6,177,668 B1 * 1/2001 Hager ................. H01J 49/4225 250/281
6,194,717 B1 * 2/2001 Hager ................... H01J 49/063 250/282
2009/0189071 A1 7/2009 Chernushevich et al.
2014/0008530 A1 1/2014 Whitehouse et al.
2021/0327700 A1 * 10/2021 Hager ..................... H01J 49/10

OTHER PUBLICATIONS

Written Opinion for International Application No. PCT/IB2021/052326 dated Jun. 16, 2021.
Office Action for Chinese Patent Application No. 202180024250.7 dated Jun. 4, 2025.

* cited by examiner

THREE STAGE ATMOSPHERE TO VACUUM MASS SPECTROMETER INLET WITH ADDITIONAL DECLUSTERING IN THE THIRD STAGE

RELATED APPLICATIONS

This application is a 35 U.S.C. 371 national stage filing of International Application No. PCT/182021/052326, filed on Mar. 19, 2021, which claims priority to U.S. provisional application No. 62/993,965 filed on Mar. 24, 2020, entitled "Three Stage Atmosphere to Vacuum Mass Spectrometer Inlet with Additional Declustering in the Third Stage," which is incorporated herein by reference in its entirety.

FIELD

The present teachings are directed to systems and methods for mass spectrometry in which a DC offset voltage applied between at least two components of the spectrometer is employed to facilitate declustering or fragmentation of ions.

BACKGROUND

Mass spectrometry (MS) is an analytical technique for determining the elemental composition of test substances with both qualitative and quantitative applications. MS can be useful for identifying unknown compounds, determining the isotopic composition of elements in a molecule, determining the structure of a particular compound by observing its fragmentation, and quantifying the amount of a particular compound in a sample. Mass spectrometers detect chemical entities as ions such that conversion of the analytes to charged ions must occur during the sampling process. During the ion formation process, some adduct ions can be formed, e.g., via solvation.

It is known that a voltage applied between an inlet orifice of a mass spectrometer and the first vacuum lens element (e.g., a skimmer or an ion guide) can increase the internal energy of incoming ions and solvated clusters to promote declustering or fragmentation of the ions. The effectiveness of such declustering and/or fragmentation, however, decreases as the orifice size increases. For example, effective declustering requires greater voltage offsets for systems having larger orifice sizes.

Accordingly, there is a need for improved systems and methods for mass spectrometry, which allow utilizing large orifice sizes and concurrently allow effective declustering and/or fragmentation of ions introduced into a mass spectrometer.

SUMMARY

In one aspect, a mass spectrometer is disclosed, which comprises an orifice plate having an orifice for receiving a plurality of ions, a first multipole ion guide disposed in a first chamber positioned downstream of said orifice plate, and a second multipole ion guide disposed in a second chamber positioned downstream of said first chamber. A first ion lens is disposed between the first and the second multipole ion guides. A third multipole ion guide is positioned in a third chamber positioned downstream of the second chamber. A second ion lens is positioned between the second and third chambers. The mass spectrometer further includes a tunable DC voltage source for applying a tunable DC offset voltage to at least one of said first, second, and third multipole ion guides and/or at least one of said first and second ion lenses for increasing the axial kinetic energy of the ions so as to cause at least one of declustering and/or fragmentation of at least a portion of the ions.

In some embodiments, each of the first, the second and the third multipole ion guide comprises a plurality of rods arranged to allow the passage of ions therebetween. In some embodiments, each of the first, the second and the third multipole ion guides comprises a series of stacked rings through which ions can pass.

In some embodiments, the tunable DC offset voltage is applied to increase the axial energy of the ions within an expansion zone of the second and the third multipole ion guide.

In some embodiments, the DC voltage is configured to cause declustering of at least some of adduct ions present in the ion flux without causing fragmentation thereof. By way of example, in some such embodiments, the applied DC voltage can be, for example, in a range of about 0 V to about 300 V, e.g., in a range of about 10 V to about 200 V, e.g., in a range of about 20 V to about 140 V. In some embodiments, the applied DC voltage can increase the axial kinetic energy of the ions so as to cause fragmentation of at least a portion of the ions.

In some embodiments, the orifice has a diameter of at least about 0.6 mm, e.g., in a range of about 0.7 mm to about 3 mm, e.g., in a range of about 1 mm to about 1.5 mm.

In some embodiments, the tunable voltage source is configured to vary the applied DC voltage in a range of 0 to about 300 V, e.g., in a range of about 10 V to about 200 V, e.g., in a range of about 20 V to about 140 V.

In some embodiments, the first chamber is maintained at a pressure in a range of about 5 Torr to about 15 Torr. In some such embodiments, the second chamber is maintained at a pressure in a range of about 1 to about 5 Torr. Further, in some embodiments, the third chamber is maintained at a pressure in a range of about 3 mTorr to about 12 mTorr.

In some embodiments, in addition to the above DC offset voltage, a DC float voltage, for example, in a range of about −10 V to about 10 V (this float voltage can also be a range of different values. For instance on ToF, it might be up to +/−500 V), can be applied to any of the first, the second, and the third multipole ion guide. In some embodiments, another voltage source is provided for applying the DC float voltage (s) to these ion guides.

In some embodiments, the mass spectrometer can include one or more radiofrequency (RF) sources for applying RF voltage(s) to at least one of said first, said second and said third multipole rods for focusing ions passing therethrough.

A variety of ion sources can be employed for generating a plurality of ions. By way of example, in some embodiments, an atmospheric pressure ion source can be employed.

In a related aspect, a mass spectrometer is disclosed, which comprises an orifice plate having an orifice for receiving a plurality of ions, wherein said orifice has a diameter of at least about 0.6 mm, e.g., in a range of about 0.7 mm to about 3 mm. A first multipole ion guide is disposed in a first chamber positioned downstream of the orifice plate. A second multipole ion guide is disposed in a second chamber positioned downstream of the first chamber. A first ion lens is disposed between the first and the second multipole ion guides. A third multipole ion guide is disposed in a third chamber positioned downstream of the second chamber. A second ion lens is disposed between the second and the third chambers, and a tunable voltage source is provided for applying a tunable DC offset voltage offset between said second multiple ion guide and said second ion lens. The tunable voltage source can adjust the applied DC voltage to increase the axial kinetic energy of the ions so as to cause at least one of declustering and fragmentation (or both) of at least some of the ions.

In some embodiments, each of the first, the second, and the third ion guide can include a plurality of rods arranged to allow the passage of ions therebetween. The rods can be arranged in a variety of different geometries, such as quadrupole, a hexapole, a dodecapole, among others.

In some embodiments, the first chamber is maintained at a pressure in a range of about 5 Torr to about 15 Torr, the second chamber is maintained at a pressure in a range of about 1 Torr to about 5 Torr, and the third chamber is maintained at a pressure in a range of about 3 mTorr to about 12 mTorr.

In some embodiments, the tunable voltage source is configured to vary the applied voltage in a range of about 0 to about 300 V, e.g., in a range of about 10 V to about 140 V.

In some embodiments, at least one of the multiple ion guides, e.g., the second ion guide, is maintained at a DC float voltage in a range of about −200 V to about +200 V, e.g., in a range of about −100 V to about +100 V. In many embodiments, all of the elements positioned upstream of where the declustering/fragmentation occurs are floated together at the same voltage. In some such embodiments, another voltage source is provided for applying a tunable DC offset voltage to the multipole ion guide, the second ion lens or any combination of ion guides and lenses. In some such embodiments, the tunable DC offset voltage can facilitate fragmentation of at least some of the ions.

In some embodiments, the mass spectrometer can include one or more radiofrequency (RF) sources for applying RF voltage(s) to at least one of the first, the second and the third multipole ion guides for radially confining and focusing the ions as they pass through the ion guide.

The multipole ion guides can be implemented in a variety of different configurations. By way of example, they can be implemented as a quadrupole, a hexapole, a dodecapole configuration, or a geometry with any number of rods. The ion guides can also be formed by employing rings rather than rods.

In some embodiments, at least one radiofrequency (RF) source applies RF voltage(s) to at least one of the first, the second and the third multipole ion guides for focusing the ions passing therethrough.

In a related aspect, a method for mass spectrometric analysis of a sample using a mass spectrometer is disclosed, where the spectrometer comprises an orifice plate and three chambers disposed in tandem downstream of said orifice plate, wherein an ion guide is positioned in each of said chambers and wherein a first ion lens is disposed between said first chamber and said second chamber and a second ion lens is disposed between said second chamber and said third chamber. The method includes the steps of ionizing a sample so as to form a plurality of ions, receiving the plurality of ions through said orifice, passing the ions through said three chambers, and applying a DC offset voltage to at least one of said ion guides and/or ion lenses so as to cause at least one of declustering or fragmentation of at least some of the ions. In some embodiments, at least some of the ions can be adduct ions.

In some embodiments, the pressure in the first chamber can be maintained in a range of about 5 Torr to about 15 Torr, the pressure in the second chamber can be maintained in a range of about 1 Torr to about 5 Torr, and the pressure in the third chamber can be maintained in a range of about 3 mTorr to about 12 mTorr.

Further understanding of various aspects of the present teachings can be obtained by reference to the following detailed description in conjunction with the associated drawings, which are described briefly below.

DETAILED DESCRIPTION

The present disclosure relates generally to systems and methods for mass spectrometry in which a DC voltage (herein also referred to as DC offset voltage) is employed to generate an electric field that can increase the axial kinetic energy of ions entering a mass spectrometer so as to facilitate at least one of declustering or fragmentation of at least a portion of the ions.

Figure 1:
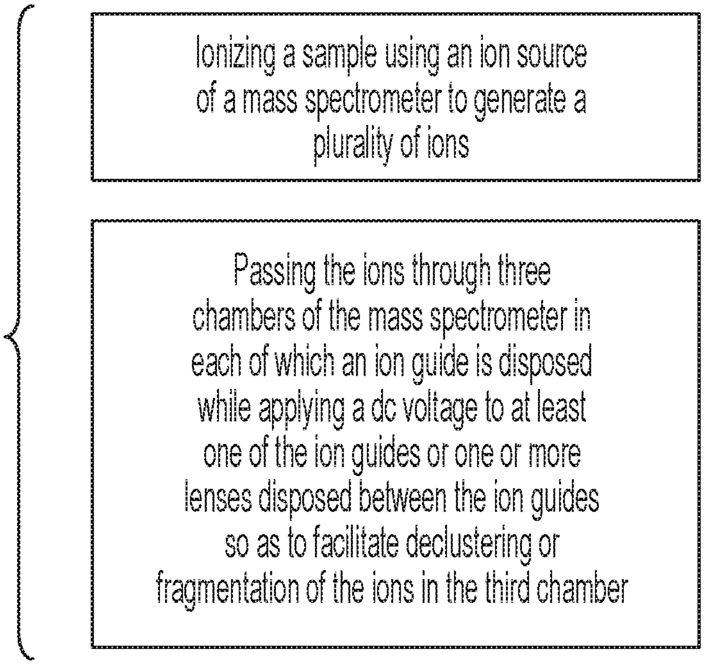
FIG. 1 is a flow chart depicting various steps in an embodiment of a method for performing mass spectroscopic analysis of a sample, FIGS. 2A, 2B and 2C schematically depict a mass spectrometer according to an embodiment of the present teachings.

The flow chart of FIG. 1 shows various steps in a method for mass spectroscopic analysis of a sample using a mass spectrometer that comprises an orifice plate and three chambers disposed in tandem downstream of the orifice plate, where an ion guide is positioned in each of the chambers and where a first ion lens is disposed between the first chamber and the second chamber and a second ion lens is disposed between the second chamber and the third chamber. The first chamber is maintained at a pressure in a range of about 5 Torr to about 15 Torr, the second chamber is maintained at a pressure in a range of about 1 Torr to about 5 Torr, and the third chamber is maintained at a pressure in a range of about 3 mTorr to about 12 mTorr.

As depicted in the flow chart, a sample is ionized so as to form a plurality of ions. In some embodiments, the plurality of ions can include one or more adduct ions (e.g., solvated ions). The ions are received through the orifice of the mass spectrometer. The ions are transmitted through the three chambers. Further, a DC voltage, e.g., a tunable DC offset voltage, is applied to at least one of the ion guides and/or at least one of the ion lenses so as to cause at least one of declustering and fragmentation of at least some of the ions within the third chamber.

Figure 2A:
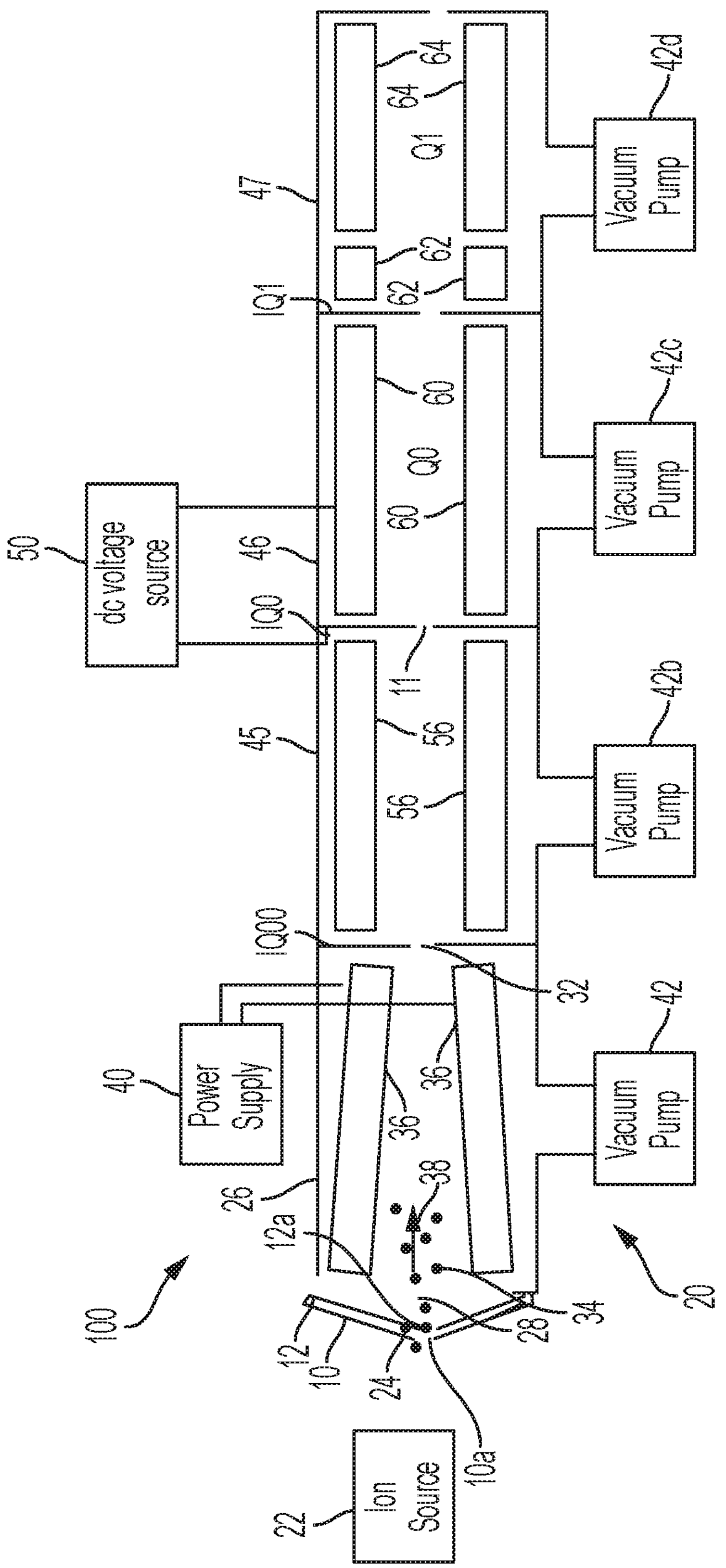
Figure 2B:
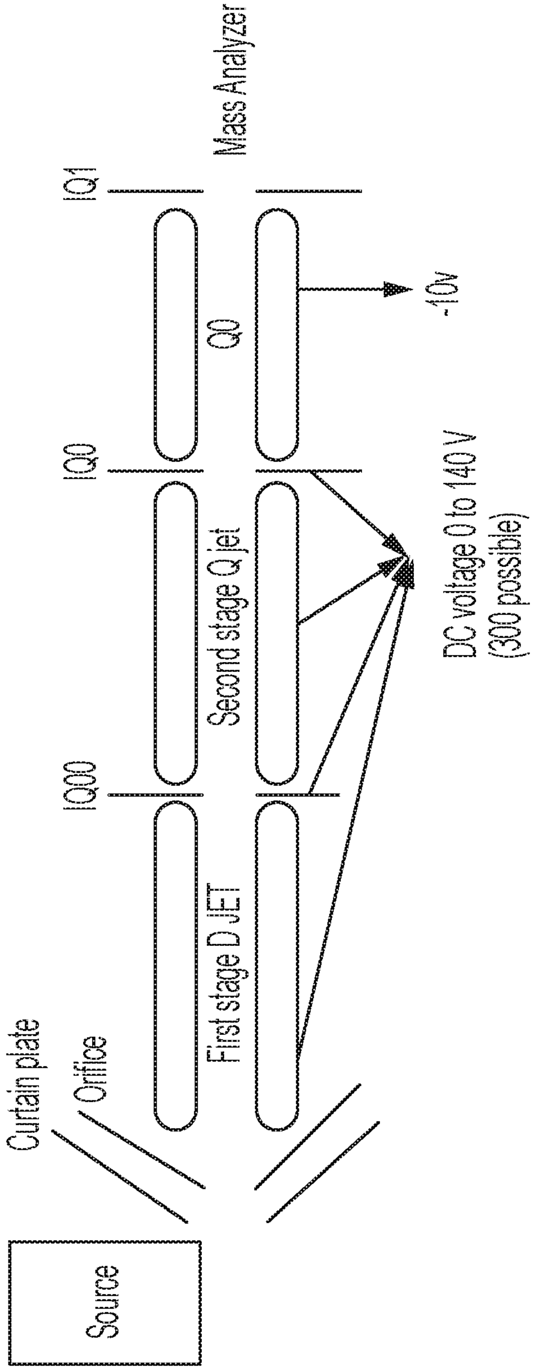

FIGS. 2A and 2B schematically depict a mass spectrometer 100 according to an embodiment, which includes an ion source 22 for generating a plurality of ions 24 from a sample of interest. In this embodiment, the ion source can be an atmospheric pressure ion source. The ions 24 can travel, along a general direction indicated by the arrow 38, toward a vacuum chamber 26 in which a multipole ion guide 36 is positioned (herein referred to also as DJET region). The ions 24 can enter the vacuum chamber 26 via an inlet 28 thereof. In this embodiment, a curtain plate 10 and an orifice plate 12 are positioned in front of the inlet 28. The curtain plate 10 and the orifice plate 12 include orifices 10*a*/12*a* through which the ions can pass to reach the vacuum chamber 26.

In this embodiment, the orifices 10*a*/12*a* are sufficiently large to allow the incoming ions to enter the chamber 26. By way of example, any of the orifices 10*a*/12*a* can be substantially circular with a diameter in a range of about 0.6 mm to about 10 mm.

The ion guide 36 can have a variety of different configurations. By way of example, in some embodiments, the ion guide 36 can be in the form of a quadrupole rod set while in other embodiments, the ion guide 36 can be in the form of a hexapole or a dodecapole rod set. More generally, the ion guide 36 can include any number of rods. Further, in some embodiments, the ion guide can be formed by using a series of stacked rings.

A vacuum pump 42 can apply a negative pressure to the chamber 26 to maintain the pressure in the chamber within a desired range. By way of example, in some embodiments, the pressure within the chamber 26 can be in a range of about 5 Torr to about 15 Torr.

A power supply 40 (herein also referred to as a voltage source) applies radiofrequency (RF) voltage(s) to the rods of the ion guide 36 for radially confining and focusing the ions 24 as they pass through the ion guide 36.

An aperture 32 disposed in an ion lens IQ00 that is positioned downstream of the ion guide 36 allows the passage of ions from the chamber 26 into a downstream chamber 45 in which another multipole ion guide 56 is positioned (herein also referred to as QJET region). A vacuum pump 42*b* can apply a negative pressure to the chamber 45 such that in some embodiments the pressure within the chamber 45 is maintained, for example, in a range of about 1 Torr about 5 Torr.

While in this embodiment the multipole ion guide 56 has a quadrupole configuration, in other embodiments it can have other configurations, such as a hexapole or a dodecapole configuration. In other embodiments, it can comprise any number of rods or can be formed using a series of stacked rings.

The voltage source 40, or another voltage source, can apply RF voltage(s) to rods of the ion guide 56 to radially confine and focus the ions 24 as they pass through the ion guide 56. An ion lens IQ0 separates the chamber 45 from the chamber 46. An aperture 11 provided within the ion lens IQ0 allows the passage of the ions 24 from the chamber 45 into the chamber 46.

A vacuum pump 42*c* may be included to apply a negative pressure to the chamber 46 so as to maintain the pressure within this chamber, for example, in a range of about 3 to about 8 mTorr. A multipole ion guide 60 is positioned within the chamber 46. The voltage source 40 or another voltage source can apply RF voltage(s) to the rods of the ion guide 60 for radially confining and focusing the ions 24 as they pass through the ion guide 60. As discussed in more detail below, the application of accelerating DC voltage(s) to one or more components positioned upstream of the chamber 46 can increase the axial kinetic energy of the ions 24 so as to cause declustering or fragmentation of at least a portion of the ions within the chamber 45 and/or chamber 46, depending on where the voltage difference is applied.

A mass analyzer Q1 is disposed in a chamber 47 that is positioned downstream of the chamber 46. A vacuum pump 42*d* applies a negative pressure to the chamber 47 so as to maintain the chamber 47 at a pressure of less than $5e^{-5}$ Torr. In this embodiment, stubby rods 62 are also positioned within the chamber 47. In this embodiment, the mass analyzer Q1 includes four rods that are arranged in a quadrupole configuration while in other embodiments, the mass analyzer can be arranged according to other configurations, such as time of flight (ToF).

It will be understood by those of skill in the relevant art that in other embodiments, pumping configurations other than those disclosed herein can be employed. For example, according to some embodiments a single pump can be employed to evacuate multiple stages of the mass spectrometer. Further, in some embodiments, one or more of the vacuum pumps may be excluded completely, to eliminate pumping in a given stage. In some embodiments, the pumping may be achieved at any of the stages by employing multiple pumps. For example, the pumps 42*c* and 42*d* may include a combination of a roughing pump and a turbomolecular pump. It will also be understood that not all mass spectrometer components have been shown. For instance in some embodiments, the mass analyzer might comprise a triple quadrupole system with two mass analyzing quadrupoles and a collision cell between them for fragmenting ions.

An ion lens IQ1 is disposed between the chambers 46 and 47 to focus the ions as they pass from the chamber 46 into 47. Similar to the other ion lenses employed in this embodiment, the ion lens IQ1 can be formed as a metal plate in which an orifice is provided to allow passage of the ions therethrough. In other embodiments, any of the ion lenses can be formed as a stacked set of plates having orifices that are substantially aligned to allow the passage of ions therethrough.

In this embodiment, a DC voltage source 50 (e.g., a tunable DC voltage source) applies a DC voltage differential between the ion lens IQ0 and the rods of the Q0 ion guide so as to accelerate the ions as they pass through the orifice associated with the IQ0 lens to enter the Q0 region. The acceleration of the ions can increase their axial kinetic energy and hence cause declustering of at least some of the adduct ions, if any, present in the flux of ions and/or fragmentation of at least some of the ions, as they pass through the gas expansion into the subsequent lower pressure region. In this embodiment, the Q0 ion guide is maintained at a float voltage in a range of about −100 V to about +100 V, e.g., about −10 V in this embodiment (e.g., by using another voltage source not shown in the figure). Thus, the DC voltage source 50 provides an additional DC offset potential above the electric potential applied to the Q0 electrodes (which is about −10 V in this embodiment).

By way of example, the DC voltage source 50 can apply a voltage differential in a range of about 0 to about 300 V, e.g., in a range of about 10 V to about 200 V, e.g., in a range of about 20 V to about 140 V, between the ion lens IQ0 and the rods of the Q0 ion guide. The applied DC voltage can be adjusted to cause declustering of adduct ions present in the ion flux, if any, without causing significant fragmentation thereof. Alternatively, the applied DC voltage can be adjusted to cause fragmentation of at least some of the ions. In some such embodiments, at least some of the adduct ions and the ions that are not in the form of clusters can undergo fragmentation. In some embodiments, an applied DC voltage in a range of about 0 V to about 200 V can be employed for declustering the adduct ions and an applied DC voltage in a range of about 0 V to about 400 V can be employed for causing ion fragmentation. Alternatively, the ions comprising background interference can be accelerated and fragmented as they pass into the Q0 region to improve the signal-to-noise ratio for compounds of interest.

The downstream Q1 can provide mass analysis of the fragment ion products in a manner known in the art.

As noted above, the applied DC voltage employed to increase the axial kinetic energy of the ions can be applied across various components of the mass spectrometer positioned upstream of the Q0 region. By way of example, in another embodiment of the present teachings, the voltage source 50 applies a DC voltage differential between the rods of the QJET ion guide (56) and the ion lens IQ0 so as to accelerate the ions in the QJET region as they approach the IQ0 lens so as to increase their axial kinetic energy and hence facilitate their declustering and/or fragmentation within either the Q0 region or upstream QJET region. By way of example, similar to the previous embodiments, in such embodiments, the applied DC voltage can be in a range of about 0 to about 200 V, e.g., in a range of about 10 V to about 140 V.

The following Examples are provided for further elucidation of various aspects of the present teachings and are not intended to be limiting of the scope of the invention.

EXAMPLES

Example 1—(Declustering)

Figure 3A:
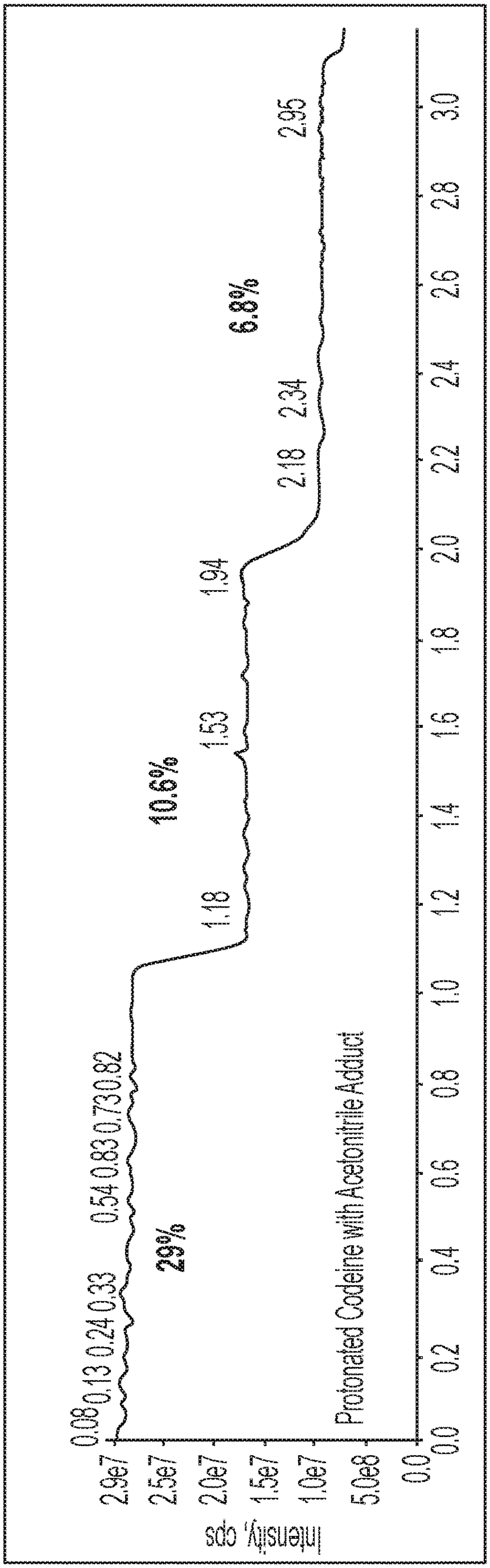
FIGS. 3A and 3B show, respectively, mass signals for protonated codeine-d3 ion with acetonitrile adduct and protonated codeine-d3 ion.
Figure 3B:
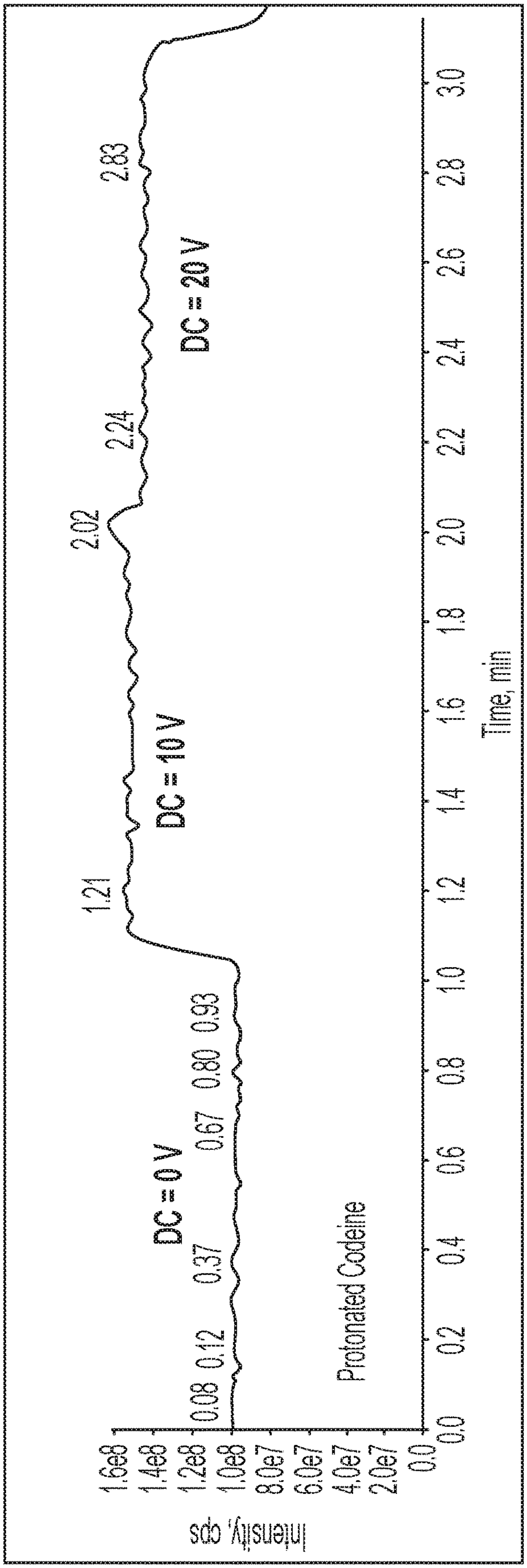

FIGS. 3A and 3B show declustering data acquired for a sample of codeine-d3 prepared in a 50:50 acetonitrile: water+5 mM ammonium acetate adjusted to a pH of 4.5. In addition to the protonated codeine-d3 ion (m/z 303), an intense peak was observed for protonated codeine with an acetonitrile adduct (m/z 344). For examples 1-5, the DC offset voltage was applied as shown in FIG. 2B, where the Q0 ion guide was maintained at a float potential of −10 V and the adjustable DC offset potential was applied on the DJET ion guide, IQ00, QJET ion guide, and IQ0. The orifice and curtain plate potentials were optimized separately. The actual potential applied to the DJET, IQ00, QJET, and IQ0 was −10 V+the DC offset potential for analysis of compounds in the positive ion mode. In the negative ion mode, the float potential was +10 V and the potential applied to the DJET, IQ00, QJET, and IQ0 was 10 V−the DC offset potential.

A triple quadrupole mass spectrometer similar to that depicted above including a dodecapole ion guide in the first vacuum stage, a quadrupole ion guide in the second vacuum stage and a quadrupole ion guide in the third vacuum stage was employed to obtain the data. The pressures in the three vacuum stages were 6 Torr, 2 Torr, and 6 mTorr. Initially, the DC offset voltage was set to 0 V such that all lens elements from the DJET to Q0 region were maintained at the same potential. Under these conditions, no additional ion heating was expected in the interface region, resulting in a codeine adduct/protonated ion ratio of about 29%. A time=1 min, the DC offset voltage was increased to 10 V such that all lenses from the DJET to IQ0 were maintained at 0 V, while the Q0 rods were maintained at −10 V. This small offset potential applied between the IQ0 lens and Q0 was sufficient to cause the onset of declustering, as evidenced by a decrease in the adduct signal (FIG. 3A) and an increase in the signal corresponding to the protonated codeine-d3 (FIG. 3B) such that the new ratio of adduct/protonated ion was about 10.6%.

A further 10 V increase in the DC offset potential to 20 V was introduced at time=2 min, resulting in a further decrease in the number of cluster ions while maintaining the signal level for the protonated codeine. The final ratio of cluster/protonated ion was 6.8%.

Thus, the data presented in FIGS. 3A and 3B show an increase in the axial kinetic energy of ions as disclosed herein can disrupt non-covalent clustering interactions to improve the ratio of signal/cluster ions population.

Example 2—(Fragmentation of an Ion with Low m/z)

As noted above, an offset DC voltage as disclosed herein can also be used for ion fragmentation. Minoxidil is a small molecule that is relatively easy to fragment in an MS/MS instrument. FIGS. 4A-4F show MS/MS data acquired for minoxidil in a collision cell of a triple quadrupole mass spectrometer (the same as the mass spectrometer used for collection of the data presented in Example 1) and FIGS. 4C-4K show fragmentation data acquired by increasing the DC offset voltage in the DJET configuration between the IQ0 lens and the Q0 rods to activate ions passing into the Q0 region.

Figure 4A:
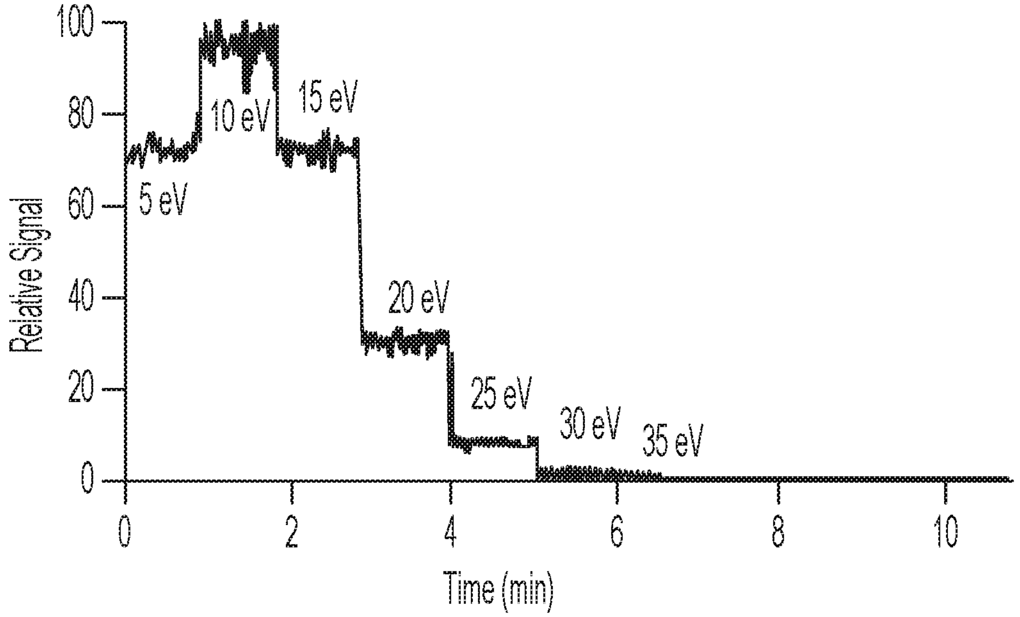
FIG. 4A shows mass signals for minoxidil parent ions measured in a triple quadrupole MS/MS instrument.
Figure 4B:
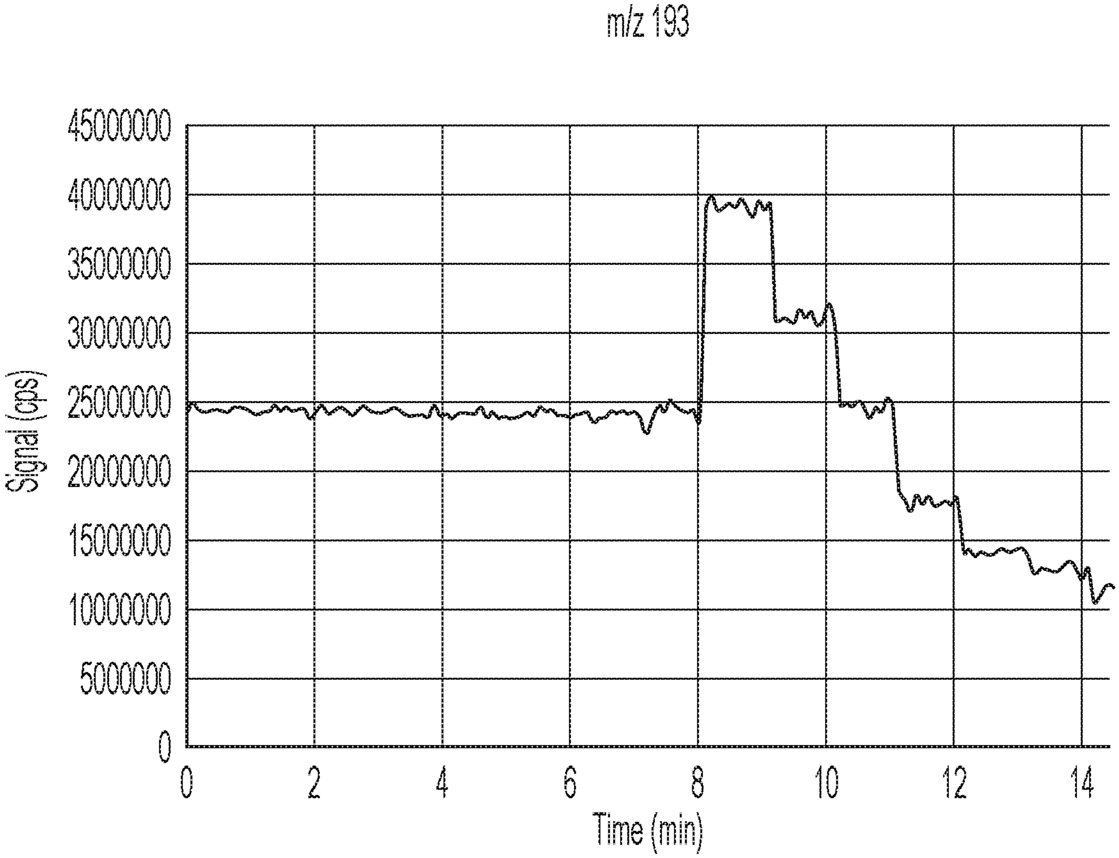
FIGS. 4B, 4C, 4D, 4E and 4F show mass signals for 5 different minoxidil daughter ions with increasing collision energy in a triple quadrupole MS/MS instrument.
Figure 4C:
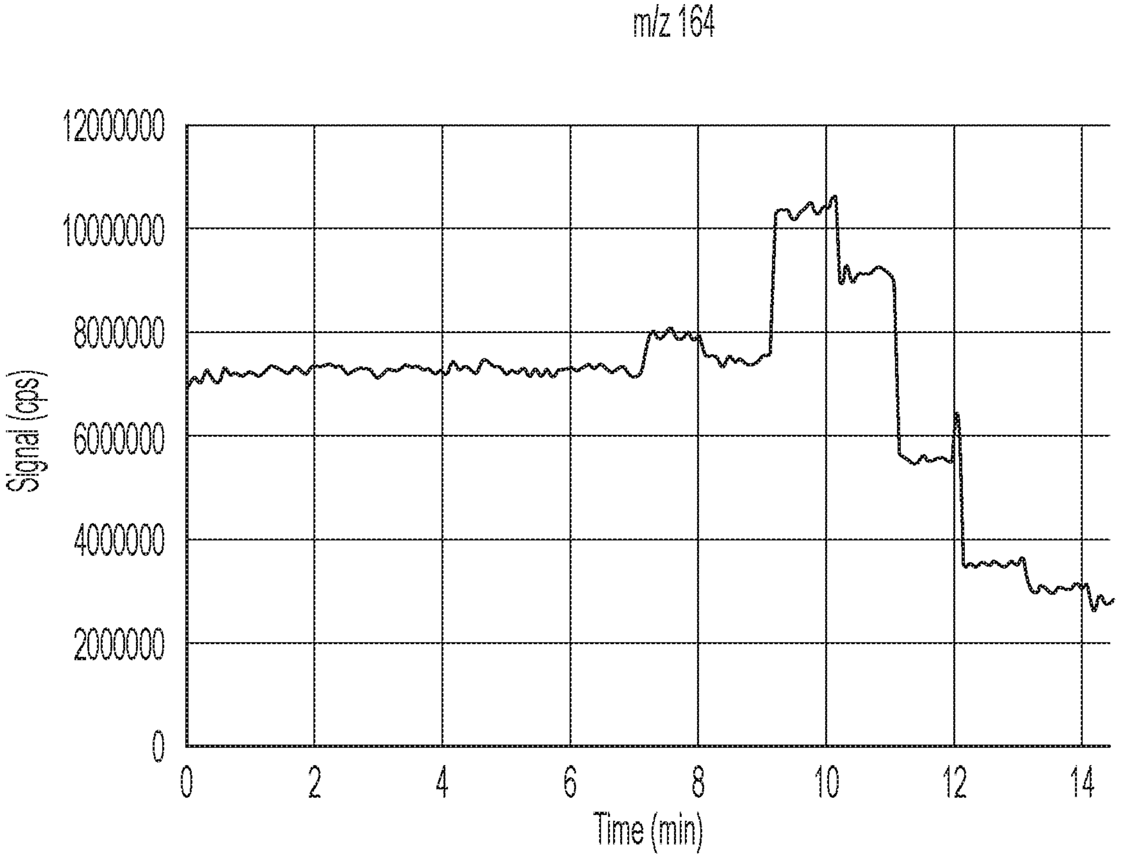
Figure 4D:
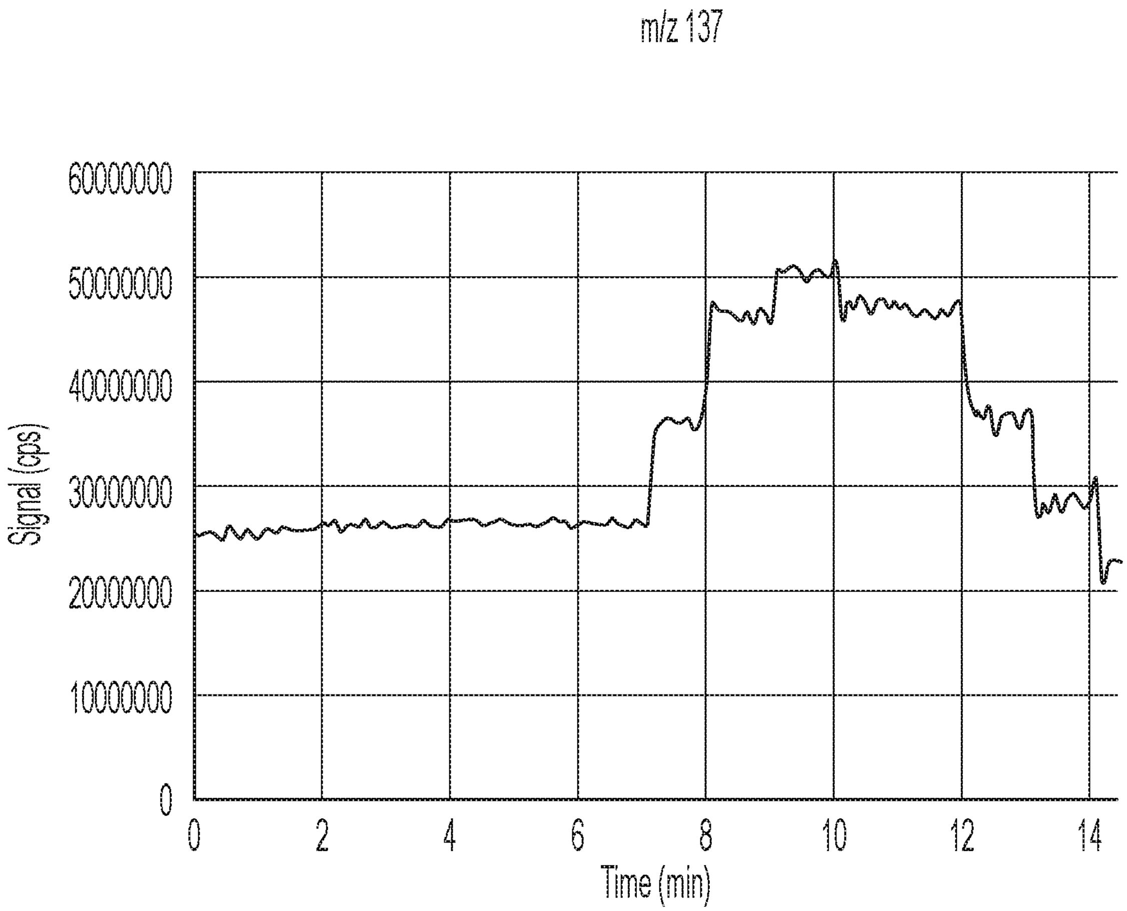
Figure 4E:
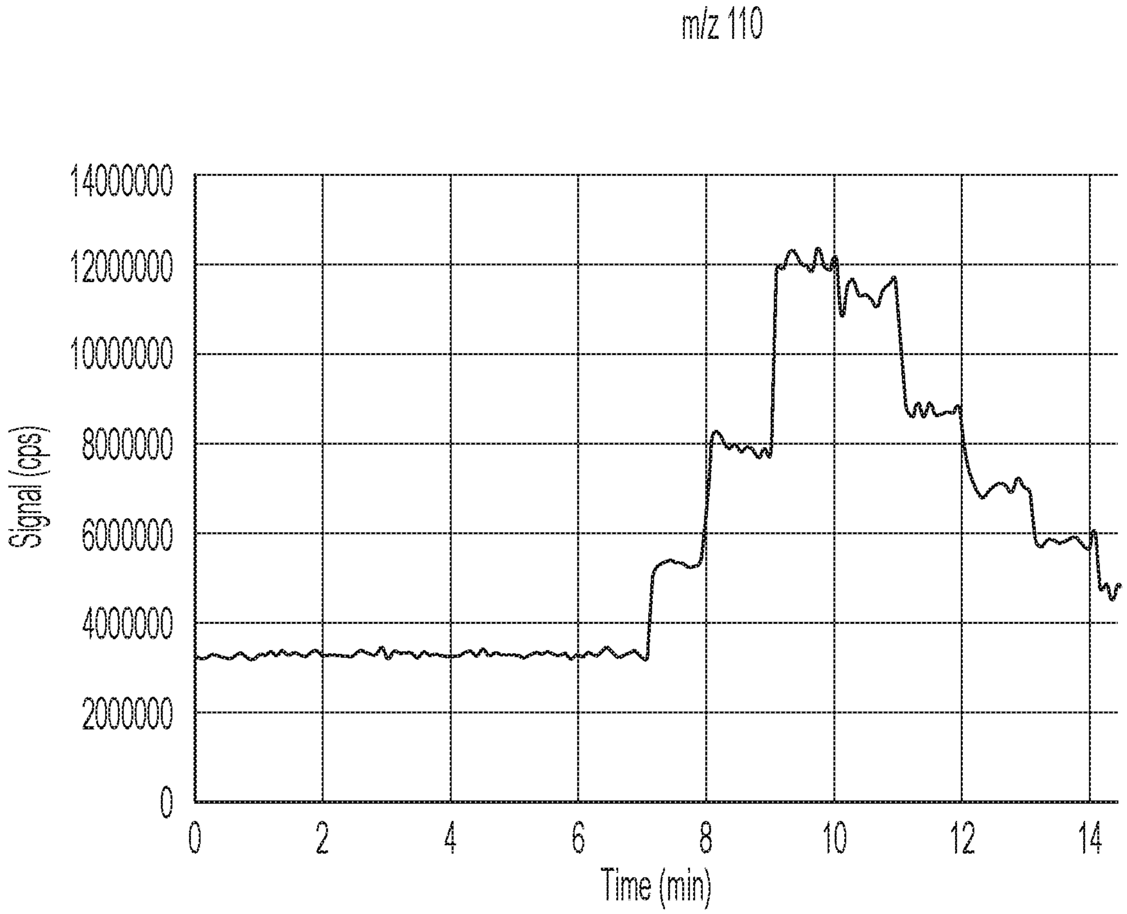
Figure 4F:
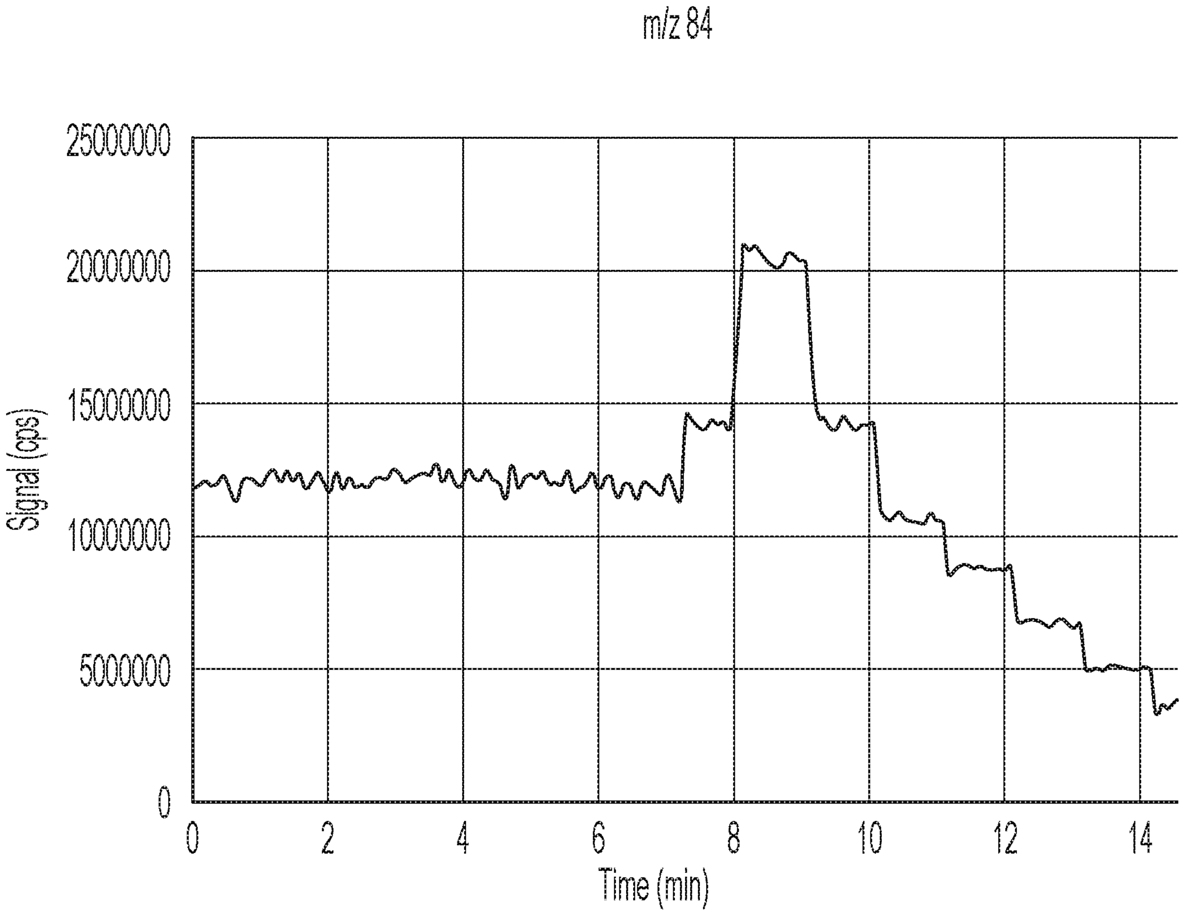

Referring to FIGS. 4A, 4B, 4C, 4D, 4E, and 4F, minoxidil is easily fragmented in the q2 collision cell of the triple quadrupole mass spectrometer. FIG. 4A shows the signal for minoxidil ions measured in the Q3 region of the spectrometer. Increasing the collision energy from 5 to 10 eV causes a slight increase in the signal for minoxidil parent ions. With collision energies higher than 10 eV, significant fragmentation of minoxidil occurs as evidenced by the decreasing parent ion signal, with essentially complete elimination of any parent ion signal at an ion energy of 35 eV or higher.

Figure 4G:
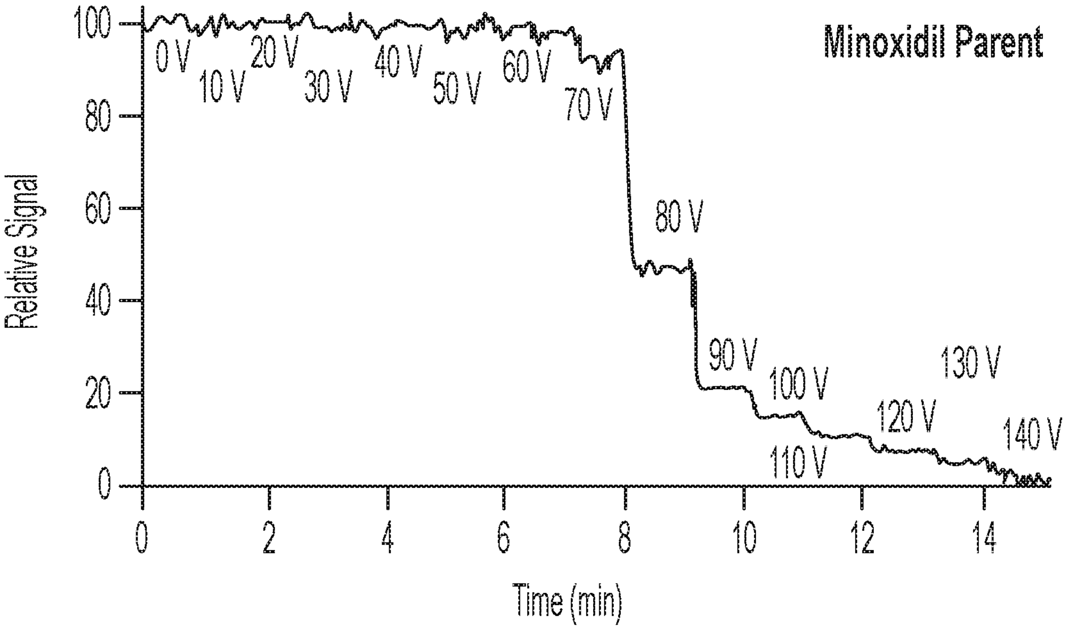
FIG. 4G shows mass signals for minoxidil parent ions when a DC voltage for increasing the axial kinetic energy of the ions was increased from 0 to 140 V.
Figure 4H:
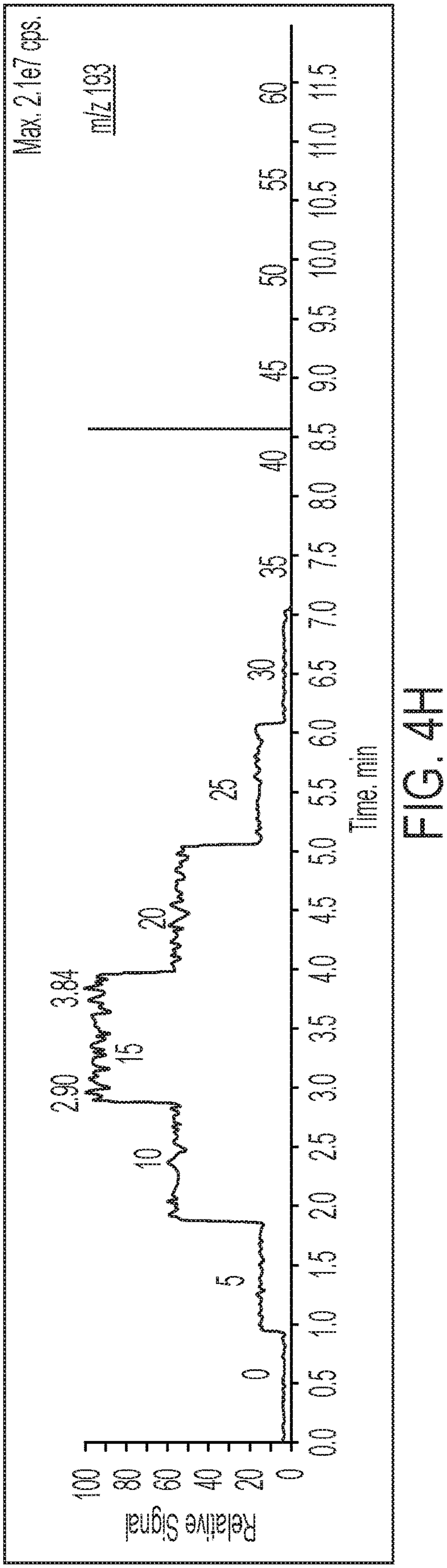
FIGS. 4H, 4I, 4J, and 4K show the onset of mass signals for 4 different minoxidil daughter ions concurrently with the signal reduction for parent ions.
Figure 4I:
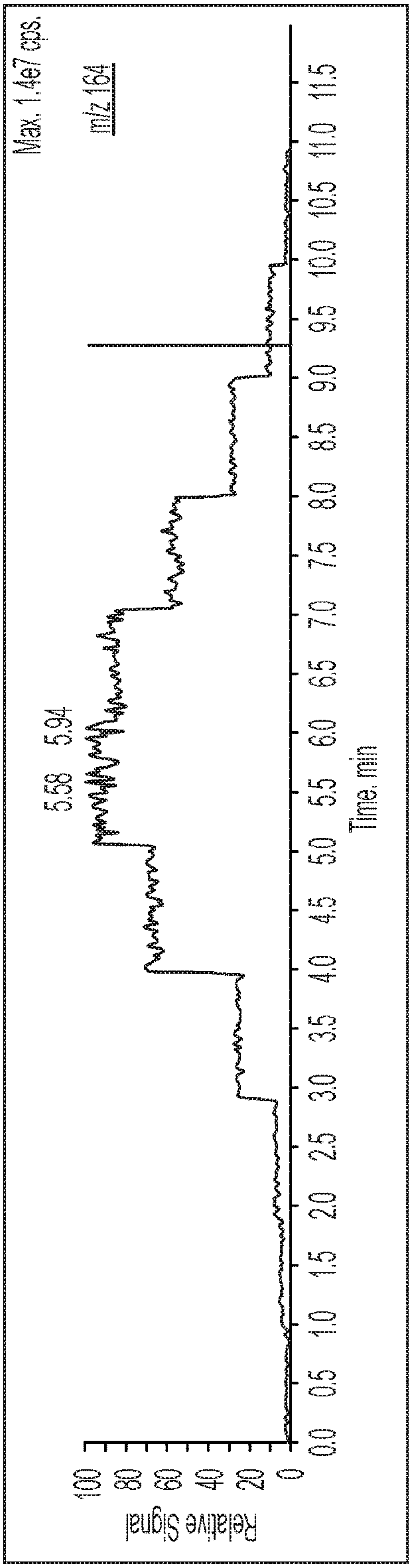
Figure 4J:
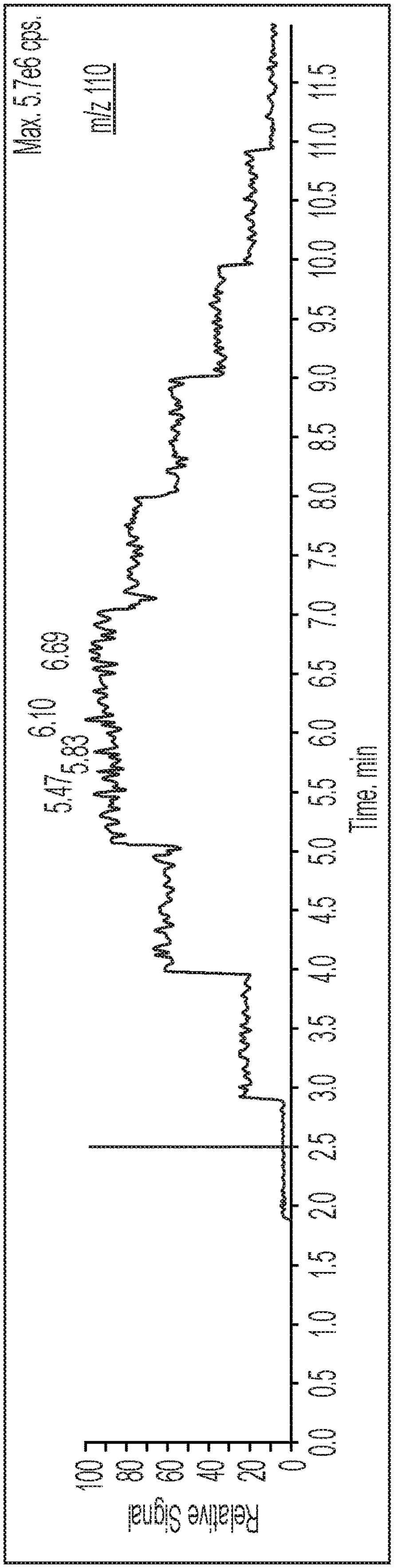
Figure 4K:
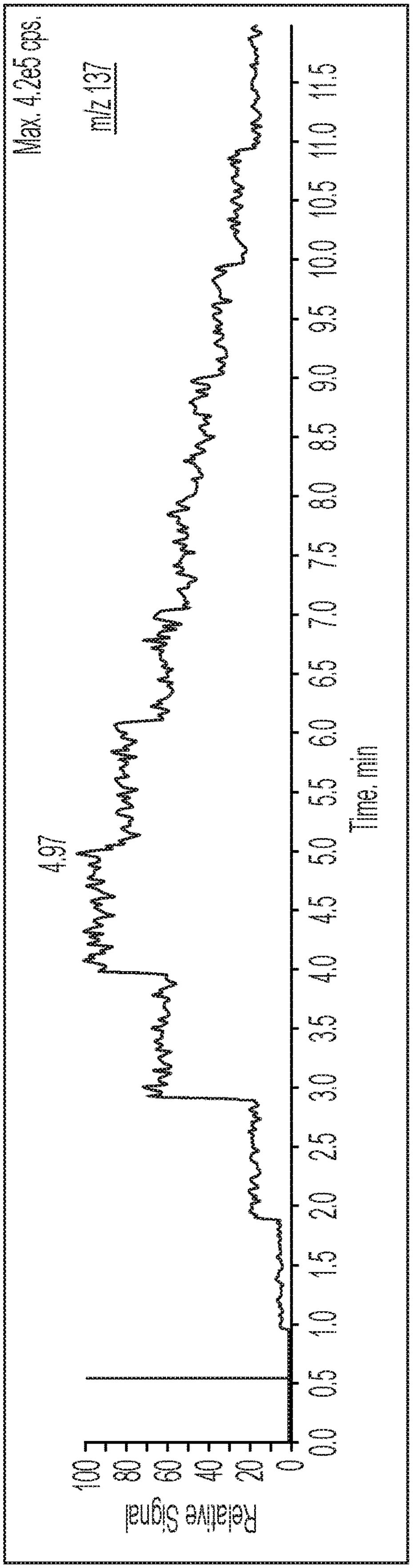

FIGS. 4B-4F show the mass signals for 5 different minoxidil daughter ions with increasing collision energy. In the case of the highest m/z daughter ion (m/z 193), the onset and optimal ion energies were 10 eV and 20 eV, respectively. Lower mass daughter ions were generated with higher ion energy settings as expected. Conversely, FIG. 4G shows the minoxidil parent ion as the front end (DC offset voltage from the IQ0 lens to the Q0 ion guide) DC offset voltage increased from 0 V to 140 V. The onset of minoxidil fragmentation was apparent with a DC offset voltage around 70 V and the maximum signal for daughter ions was measured with DC offset voltages of 80-110 V. FIGS. 4H, 4I, 4J, and 4K show the onset of signal for 4 different minoxidil daughter ions concurrently with the signal reduction of parent ions.

The data presented in above FIGS. 4A-4K show the present teachings are effective in causing fragmentation of ions, such as those that require low collision energies for dissociation in an MS/MS mass spectrometer.

Example 3—(Fragmentation of an Ion with Moderate m/z)

Figure 5A:
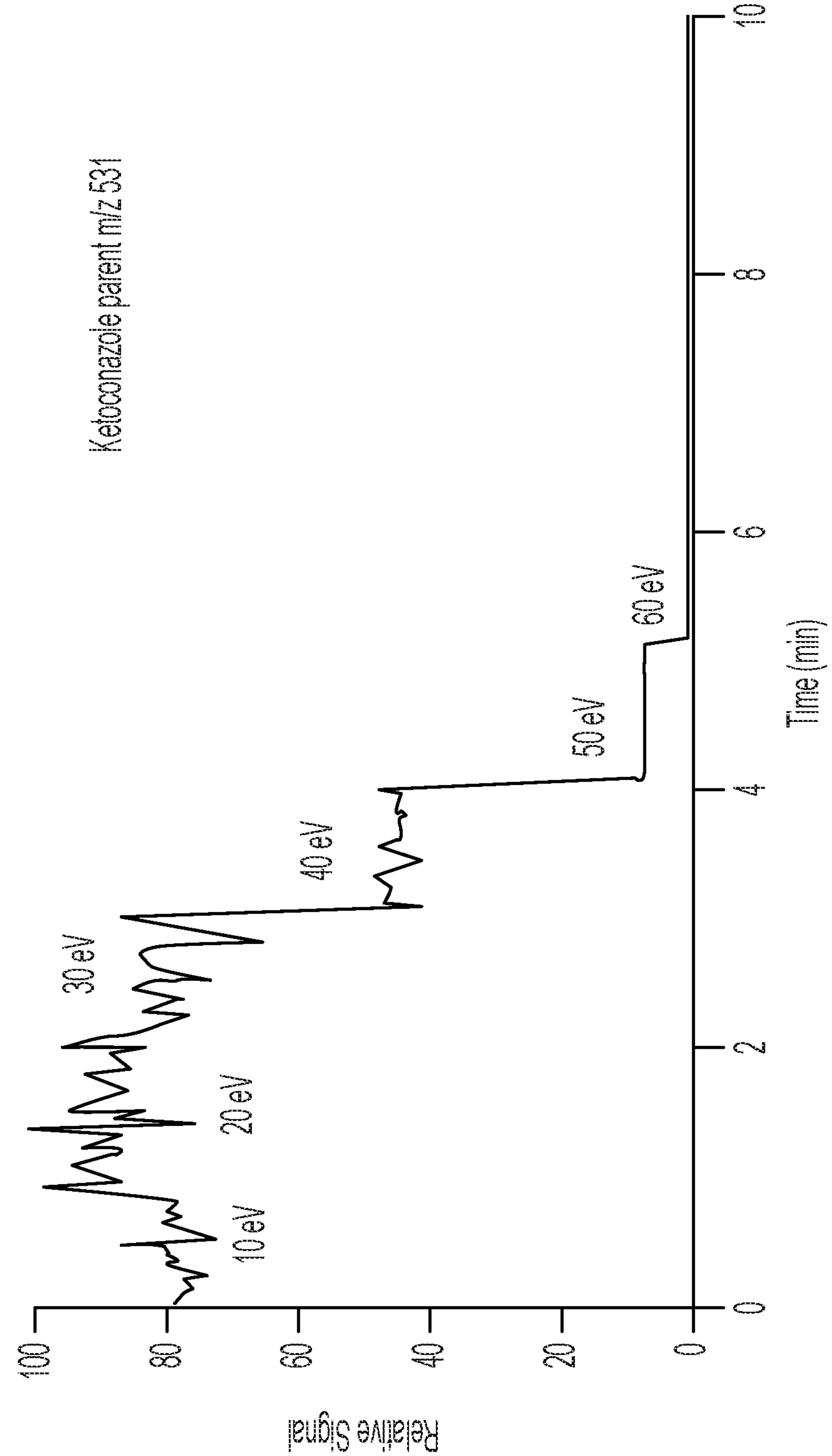
FIG. 5A shows MS/MS data for ketoconazole as a function of ion energy, indicating that the fragmentation of ketoconazole requires ion energies of 40 eV or higher.
Figure 5B:
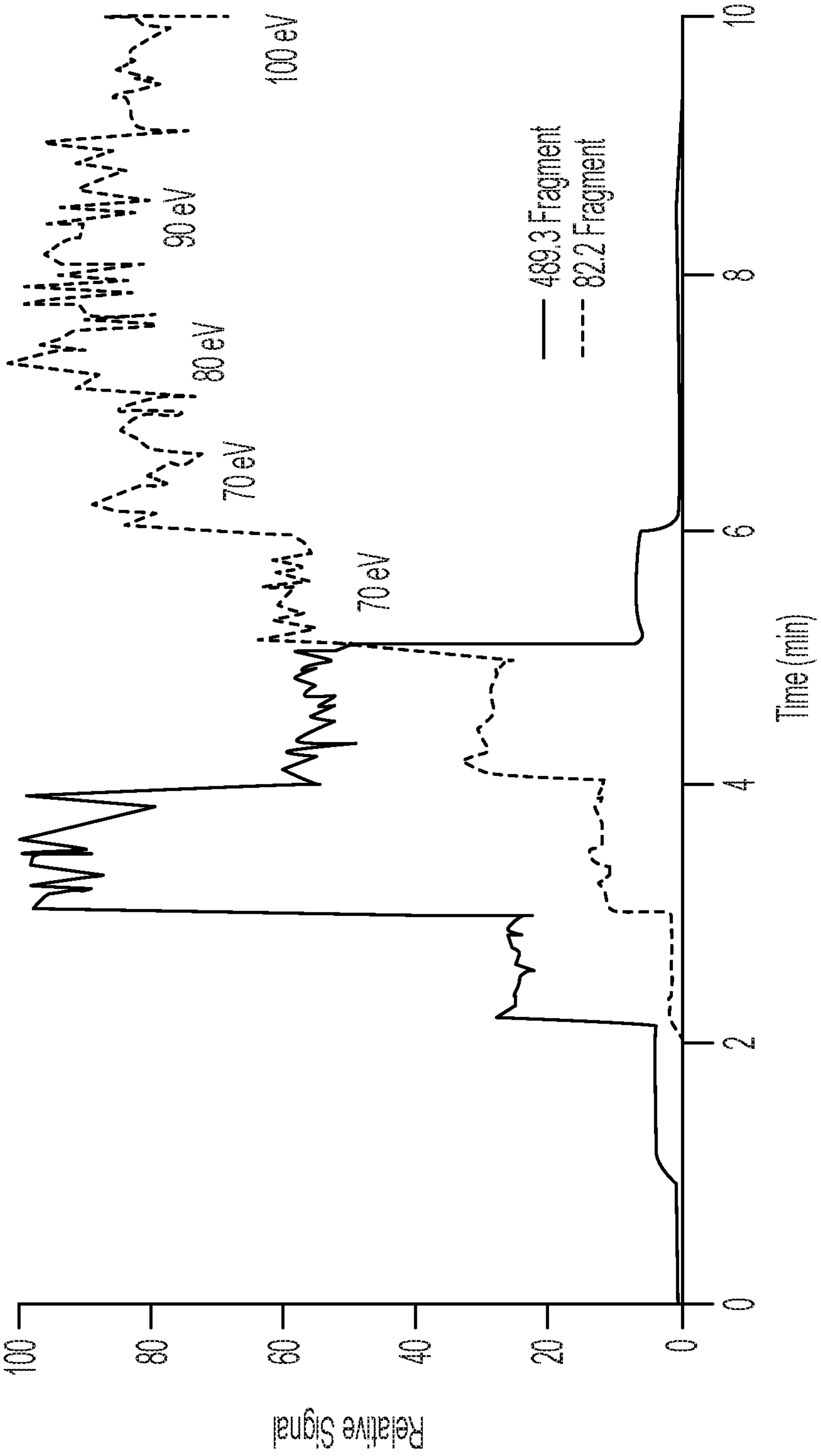
FIG. 5B shows MS/MS data for 2 different ketoconazole daughter ions, namely, m/z 489.3 and 82.2.

FIGS. 5A/5B show MS/MS fragmentation data acquired for Ketoconazole in a collision cell of a triple quadrupole mass spectrometer by increasing the collision energy to activate ions passing through the Q2 region. FIG. 5A shows that the fragmentation of ketoconazole requires ion energies of 40 eV or higher. FIG. 5B shows the signal for 2 different ketoconazole daughter ions, namely, daughter ions with m/z of 489.3 and 82.2. The onset ion energies for m/z 489.3 and m/z 82.2 were, respectively, 30 eV and 40 eV.

Figure 5C:
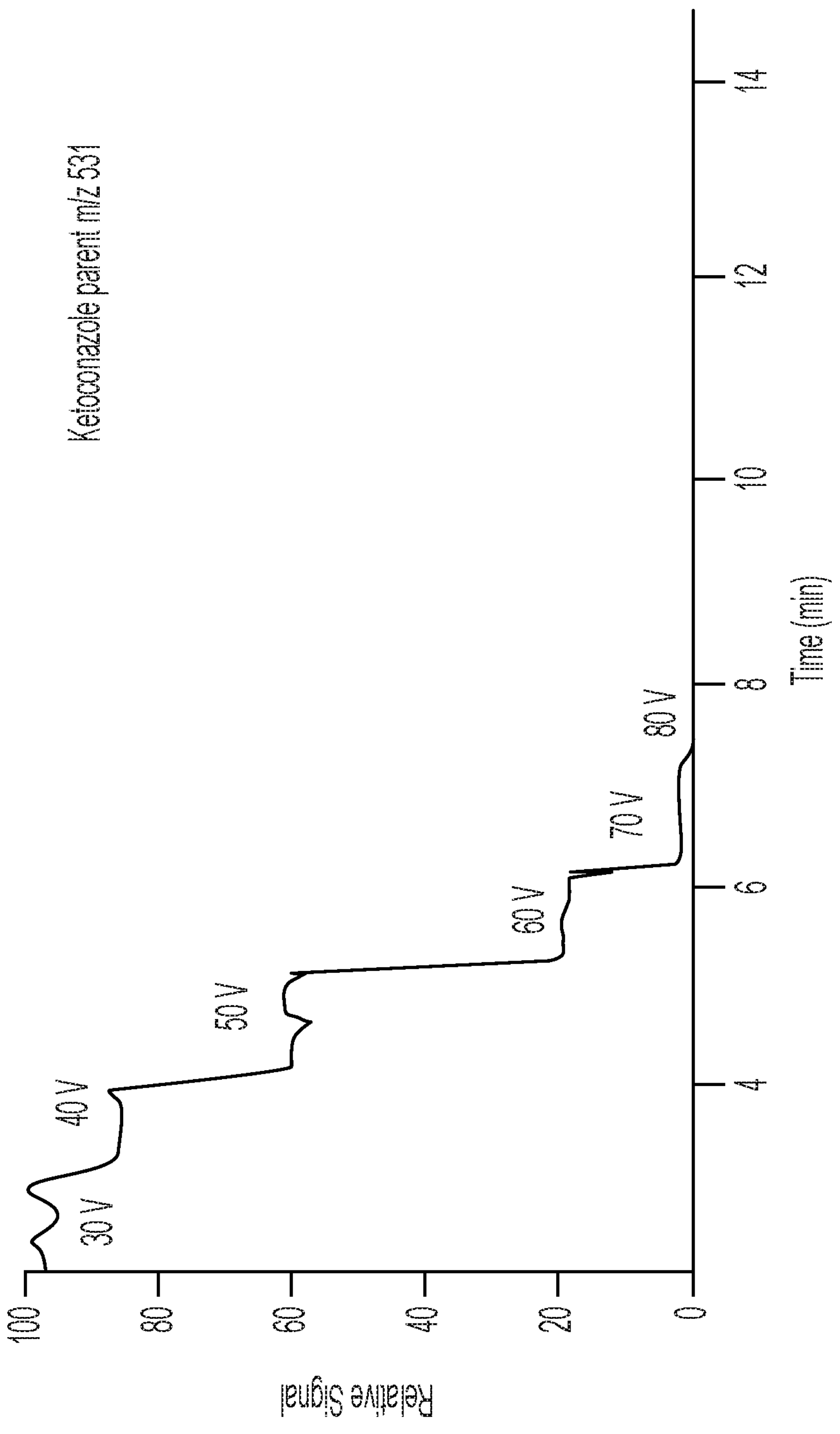
FIG. 5C shows mass signals for ketoconazole ions for different DC voltages applied in accordance with the present teachings for increasing the axial kinetic energies of the ions.
Figure 5D:
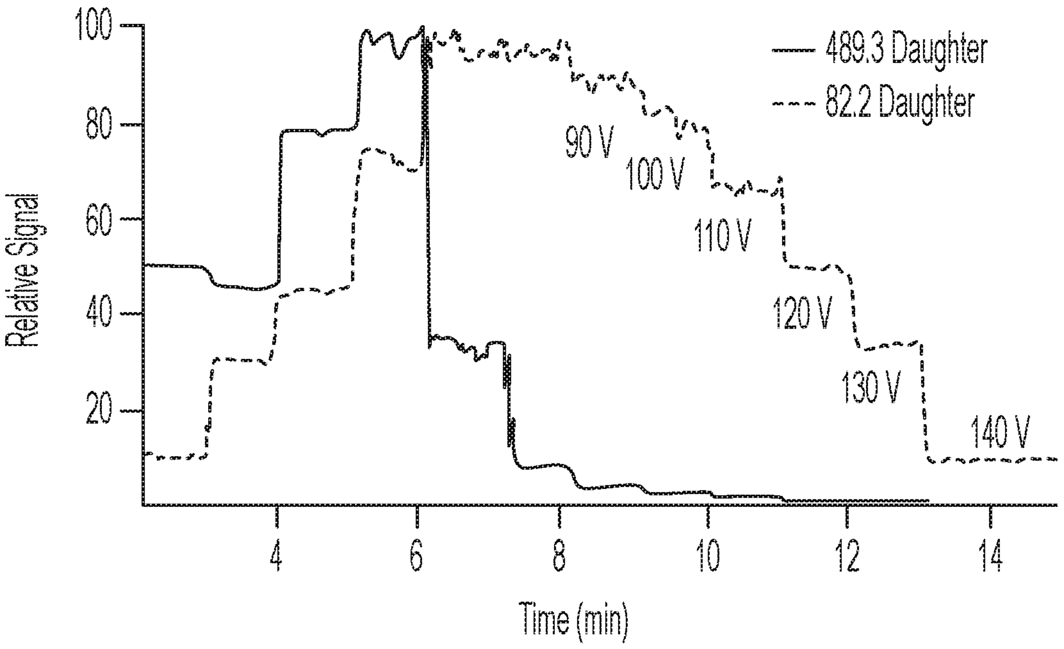
FIG. 5D shows mass signals for 2 daughter ions of ketoconazole for a DC voltage applied in accordance with the present teachings in a range of about 40 to 140 V for increasing the axial kinetic energies of the ions.

FIGS. 5C/5D show fragmentation data for ketoconazole when a DC offset voltage was applied between the IQ0 lens and the Q0 in accordance with the present teachings. The onset for ketoconazole fragmentation was approximately 40 V DC offset voltage and the parent ion signal was essentially eliminated with voltage values above 90 V. The elimination of the parent ion signal coincided with an increase in the signal associated with 2 daughter ions monitored for this compound. Maximum daughter ion signals were observed with an applied DC offset voltage from approximately 40-110 V.

Example 4—(Fragmentation of an Ion that Requires High Internal Energy to Dissociate)

Figure 6A:
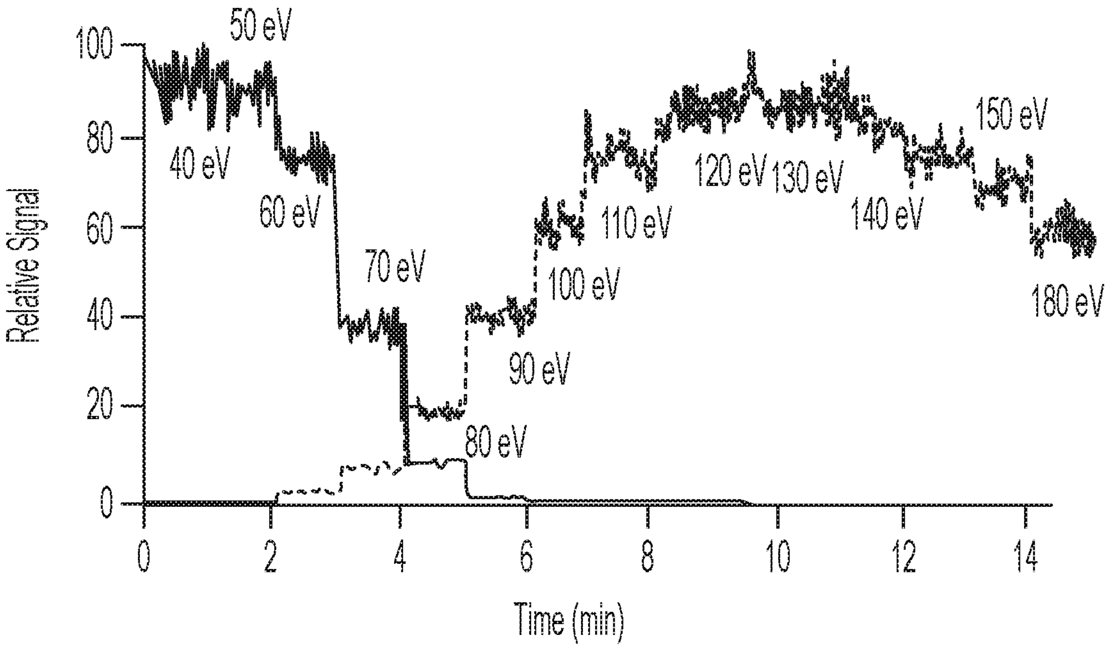
FIG. 6A shows MS/MS data acquired for taurocholic acid in a collision cell of a triple quadrupole mass spectrometer.
Figure 6B:
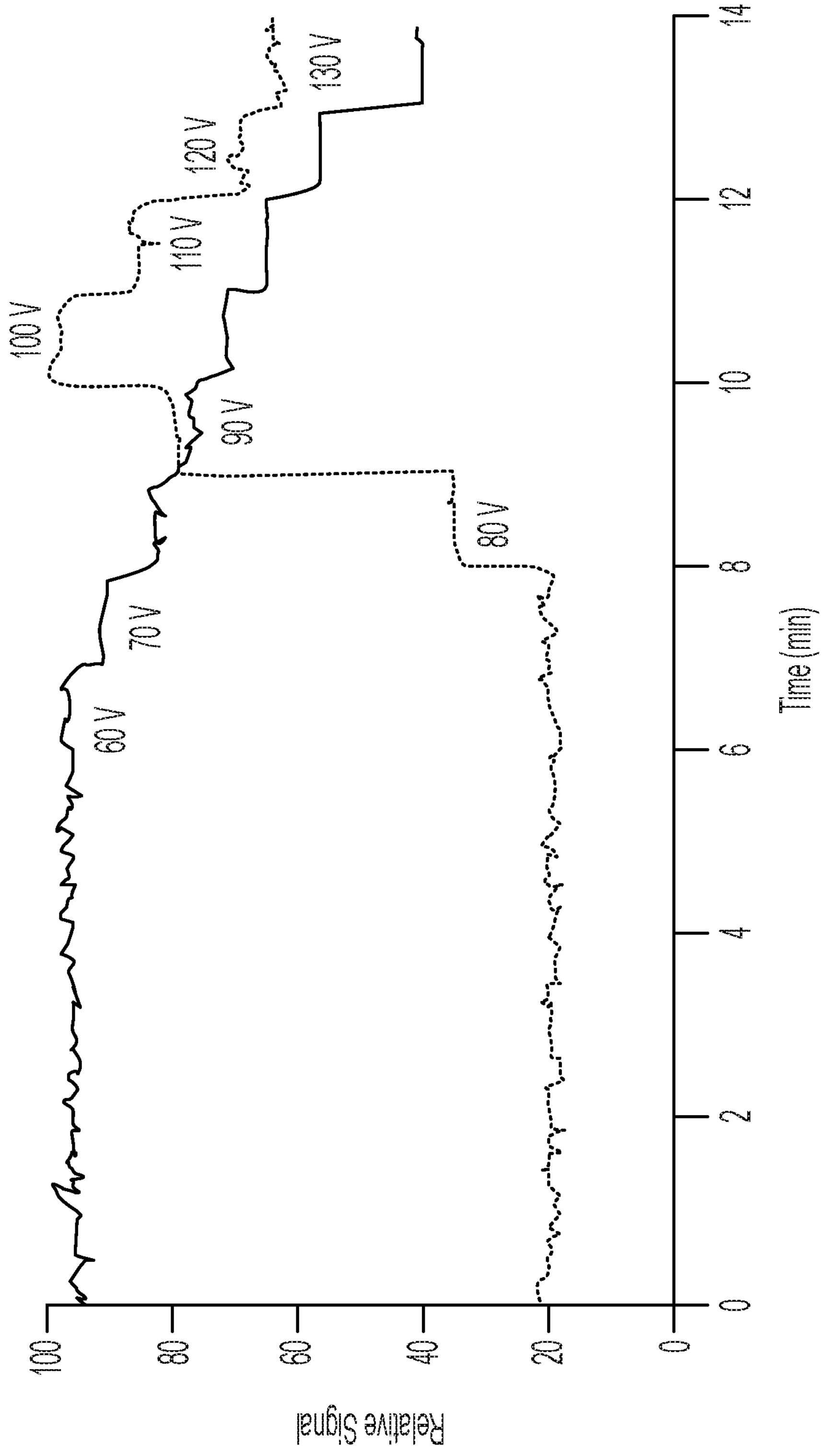
FIG. 6B shows fragmentation data acquired for taurocholic acid by increasing a DC voltage applied in accordance with the present teachings for increasing the axial kinetic energies of the ions.

FIGS. 6A and 6B show MS/MS data acquired for taurocholic acid in a collision cell of a triple quadrupole mass spectrometer and fragmentation data acquired by increasing the potential difference between the IQ0 lens the Q0 ion guide to activate ions passing into the Q0 region, respectively. The Q0 region was maintained at a pressure of about 7 mTorr.

Referring to FIG. 6A, the onset for fragmentation of taurocholic acid occurs around 60 eV, as evidenced by the signal reduction of the black trace. The grey trace shows the signal for a very low m/z daughter ion (m/z=80), where the threshold and optimal collision energies were 60 eV and 130 eV, respectively. The onset of generation of the m/z 80 daughter ion using the methods disclosed herein is 80 V (FIG. 6B), with maximum daughter ion signal observed with 100 V DC offset voltage. When the DC offset voltage was increased to 140 V, approximately a 2-fold reduction of parent ion signal was observed for taurocholic acid. Similar to the MS/MS data, the m/z 80 daughter ion requires substantial internal energy to generate.

Example 5—(Declustering to Improve the Signal-to-Noise (S/N) Ratio for LC/MS

Figure 7A:
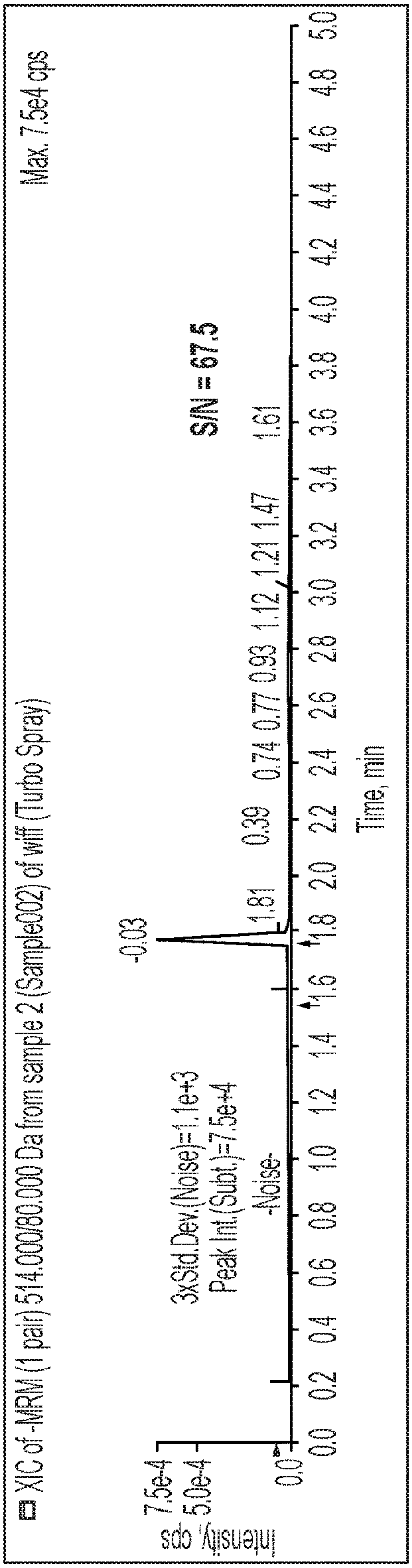
FIGS. 7A-7D show LC/MS data for a sample of taurocholic acid at varying levels of declustering based on the levels of applied DC voltages in accordance with the present teachings.
Figure 7B:
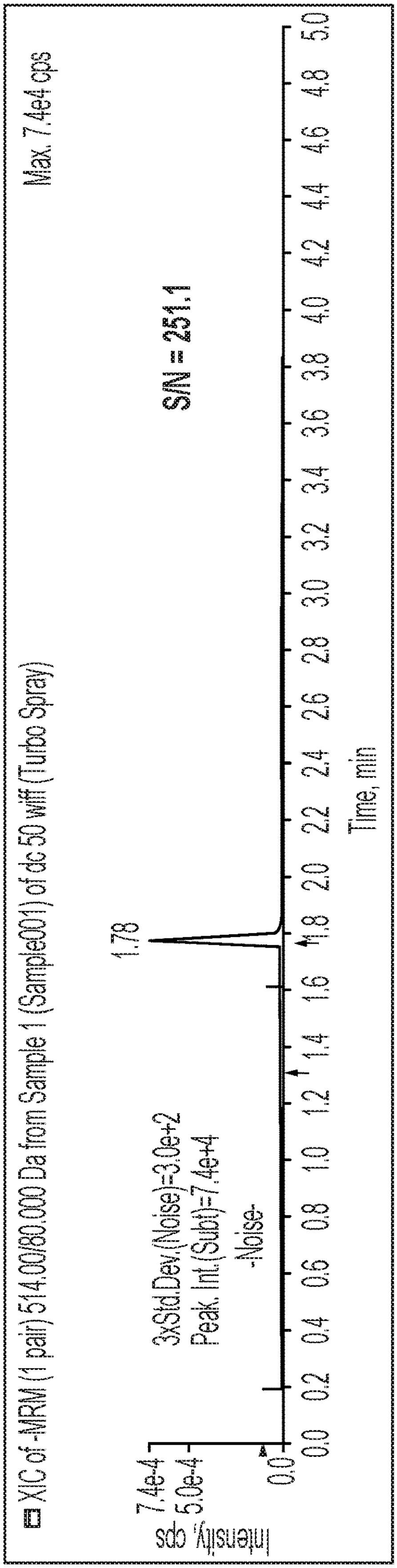
Figure 7C:
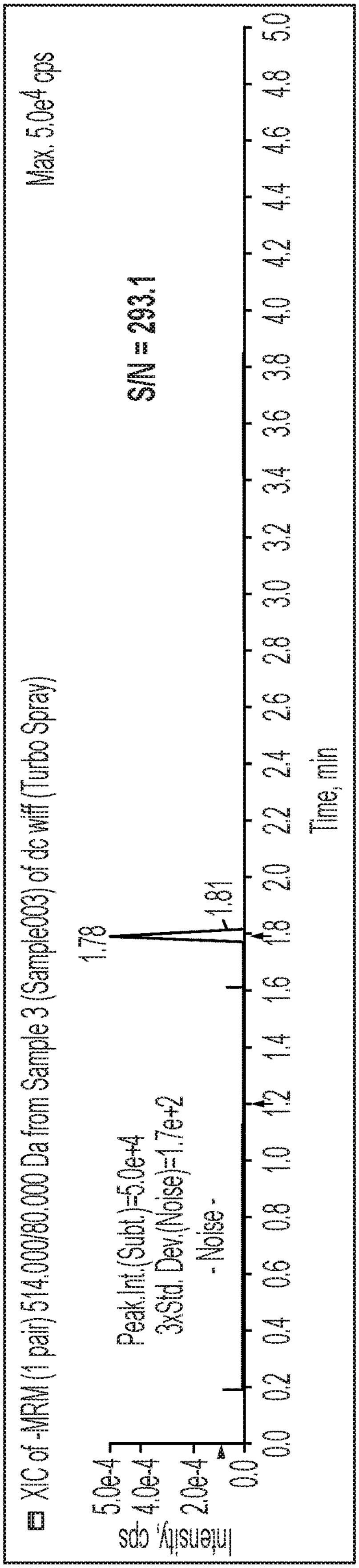
Figure 7D:
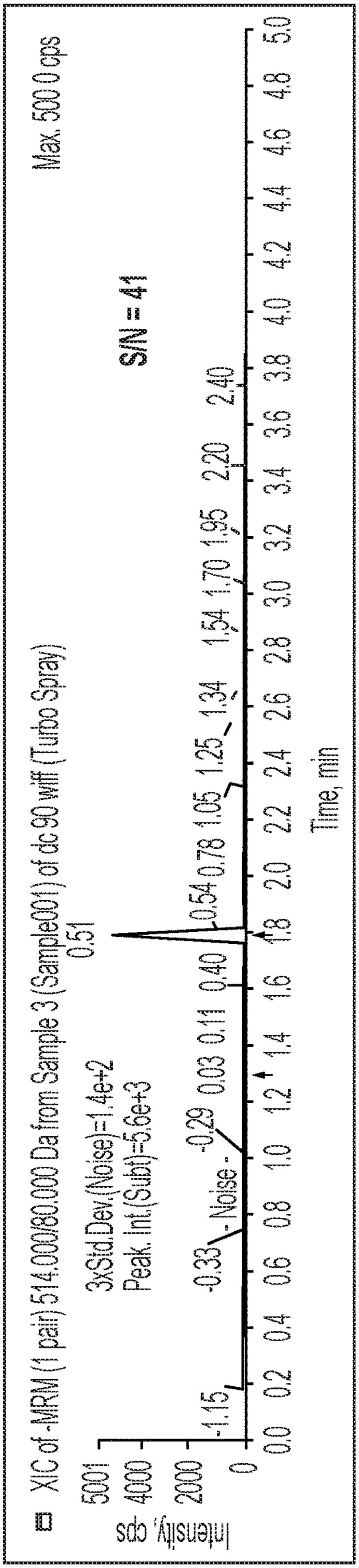

Liquid chromatography-Mass spectrometry (LC/MS) experiments were conducted with a sample of 1 pg/μL taurocholic. The data are presented in FIGS. 7A-7D. LC/MS experiments were conducted at a 500 μL/min flow rate using a 2.1 mm LC column (C18). All parameters were maintained constant for the data in FIGS. 7A-7D, except that a DC offset voltage applied between 0 V and 140 V was adjusted to provide varying levels of declustering. The DC offset voltage settings were 0 V (FIG. 8A), 50 V (FIG. 8B), 65 V (FIG. 8C), and 90 V (FIG. 7D).

When the DC offset voltage was set to 0 V, the peak height for deprotonated taurocholic acid was 75,000 cps and the background continuum was relatively high, resulting in a S/N ratio of 67.5. The DC offset voltage was then increased to 50 V as shown in FIG. 7B. When the DC offset voltage was set to 50 V, there was no significant impact on the intensity of the deprotonated taurocholic acid (i.e., the peak height was within 2% of the value measured with 0 V DC offset voltage). However, there was a substantial drop in the level of the background continuum, resulting in a S/N ratio of 251.1. These data show that improved declustering can provide substantial improvements in detectability for this compound. The DC offset voltage was further increased to 65 V as shown in FIG. 7C. At a DC offset voltage of 65 V, some fragmentation of the parent ion peak was apparent. The peak intensity dropped by approximately 34%; however, the background decreased by a greater margin, resulting in a further improved S/N ratio. Finally, the applied DC offset voltage was increased to 90 V to induce more fragmentation of the deprotonated taurocholic acid ions, as shown in FIG. 7D. Under these conditions, the peak intensity dropped by more than 13×, resulting in a poor S/N ratio of 41.

The data presented in FIGS. 7A-7D demonstrate that additional improvements in S/N ratio can be achieved by controlling the DC offset voltage that causes the increase in the axial kinetic energy of the ions. As shown in Table 1 below, this approach yields reproducible results for replicate LC/MS analyses conducted with the DC offset voltage set to either 0 V or 65 V. The use of the declustering approach according to the present teachings resulted in an average improvement in the S/N ratio of about 3.8×.

TABLE 1

| Injection Number | DC Offset Voltage = 0 V | DC Offset Voltage = 65 V |
|---|---|---|
| 1 | 73.1 | 286 |
| 2 | 78.2 | 316 |
| 3 | 82.5 | 306 |
| 4 | 89.8 | 309 |
| Average | 81 +/− 7 | 304 +/− 13 |

Example 6—(Fragmentation to Reduce/Remove Interfering Peaks for LC/MS)

Figure 2C:
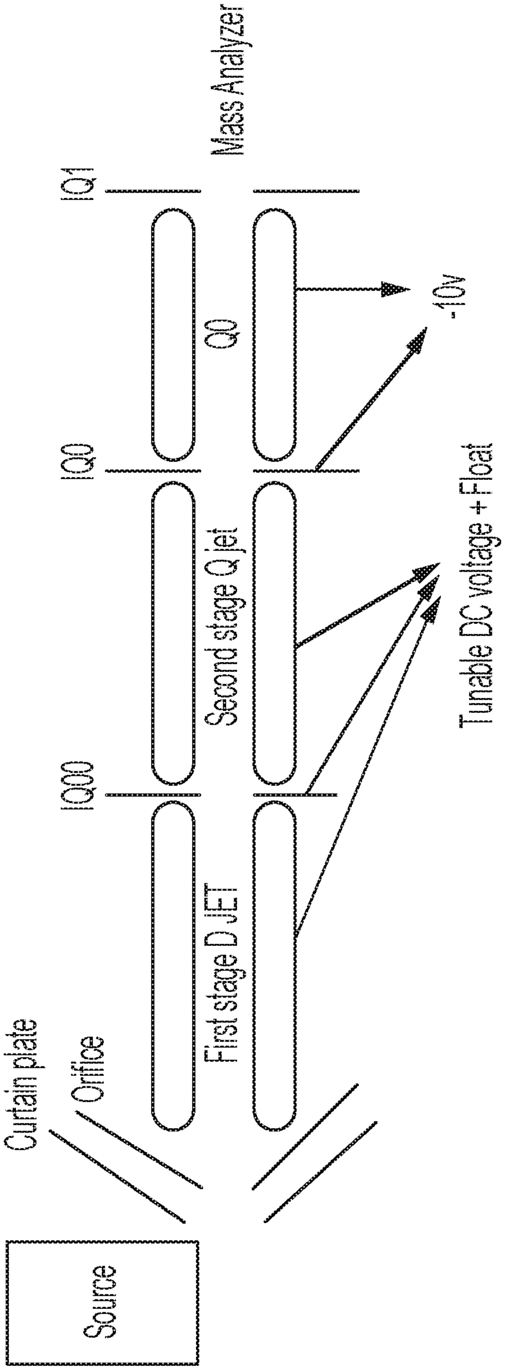
Figure 8A:
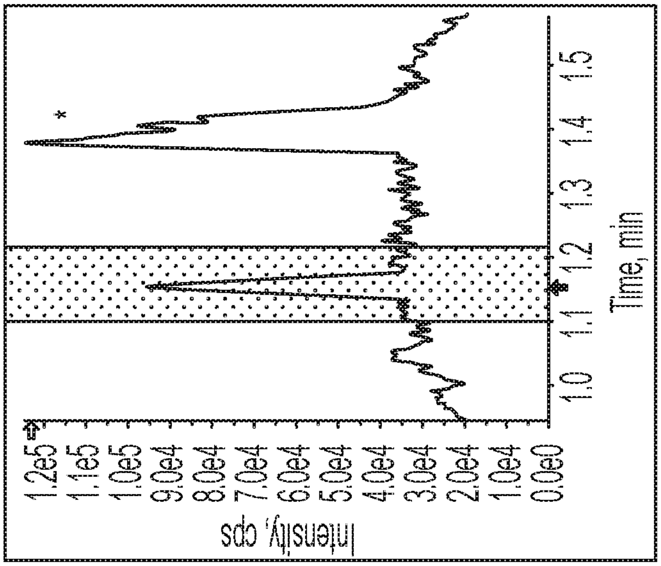
FIGS. 8A-8C show data obtained in LC/MS experiments conducted with a sample of alprazolam at different DC voltage offsets between the IQ0 lens and the rest of upstream ion guides of the mass spectrometer, which are all floated to the same DC voltage.
Figure 8B:
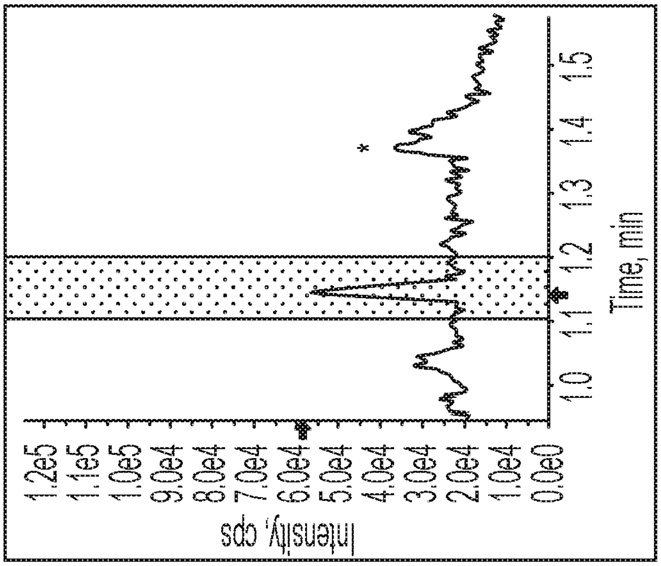
Figure 8C:
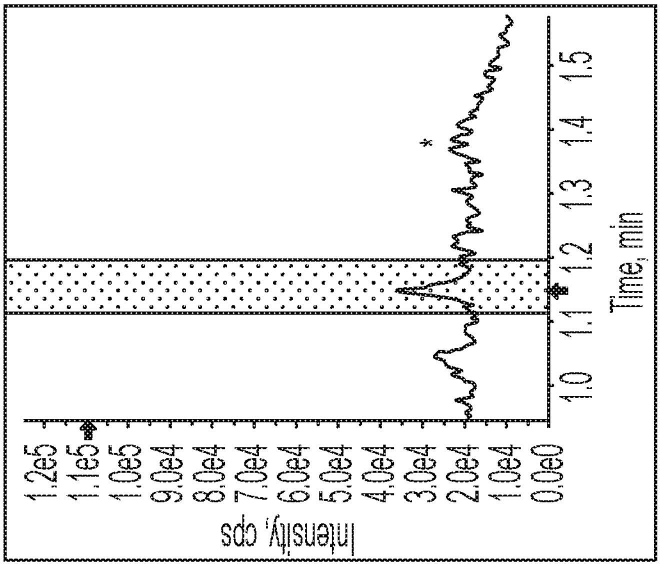

For the data presented in Example 6, the DC offset potential was applied as shown in FIG. 2C, where the IQ0 and Q0 ion guide were maintained at −10 V float voltage. The DC offset voltage was applied to the DJET ion guide, IQ00, and the QJET ion guide, and the curtain plate and orifice plate potentials were optimized separately. The actual potential applied to the DJET ion guide, IQ00, and the QJET ion guide was −10 V+the DC offset voltage. Liquid chromatography—Mass spectrometry (LC/MS) experiments were conducted with a sample of alprazolam at different DC offset voltage offsets between the QJET and IQ0 lens. In this case the DC offset voltage was applied at the back of the chamber with the QJET ion guide to increase the axial energy. With this embodiment, the DC offset voltage magnitude may need to be increased relative to the previous embodiment where the DC offset voltage was applied between the IQ0 and the Q0. The DC offset voltage was applied to the DJET, IQ00, and QJET. The orifice potential was controlled separately and maintained at a potential more positive than the DJET for analysis of the ions. The data are depicted in FIGS. 8A-8C. The shaded peak in the chromatogram is alprazolam, while the peaks with an asterisk is an interference. When there is no DC offset between QJET and IQ0 (FIG. 8A), the interfering peak is significantly larger than alprazolam; under different chromatographic conditions it may overlap with the alprazolam peak and negatively impact its quantitation limit. FIGS. 8B and 8C show the effect of applying a 45 V and 50 V DC offset potential, respectively, between the QJET and IQ0. Under these conditions, the interfering peak is effectively removed, and no longer presents a risk to good quantitation of alprazolam.

The present teachings have demonstrated declustering and fragmentation using potential offset between QJET and IQ0 and IQ0 and Q0. It will be apparent to those having ordinary skill in the art in view of the present teachings that any means of increasing the axial energy of the ions into the Q0 region can accomplish declustering and fragmentation as discussed herein. For example, the increase in the axial kinetic energy of ions can be achieved by using DC offset potentials between a variety of components of the system.

Those having ordinary skill in the art will appreciate that various changes can be made to the above embodiments without departing from the scope of the invention.

What is claimed is:

1. A mass spectrometer, comprising:

an orifice plate having an orifice for receiving a plurality of ions, a first multipole ion guide disposed in a first chamber positioned downstream of said orifice plate, a second multipole ion guide disposed in a second chamber positioned downstream of said first chamber, a first ion lens disposed between said first and second multipole ion guides, a third multipole ion guide disposed in a third chamber positioned downstream of said second chamber, said third multipole ion guide comprising a plurality of rods arranged to allow passage of said plurality of ions therebetween, a second ion lens disposed between said second and third chambers, and a mass filter disposed in a fourth chamber downstream of the third chamber, and at least one tunable DC voltage source configured to apply a tunable DC offset voltage between said second multipole ion guide and said second ion lens or between said second ion lens and said third multipole ion guide, so as to increase an axial kinetic energy of said plurality of ions to cause at least one of declustering and fragmentation of at least a portion of said plurality of ions in said third chamber, wherein said first chamber is maintained at a pressure in a range of about 5 Torr to about 15 Torr, said second chamber is maintained at a pressure in a range of about 1 Torr to about 5 Torr, and said third chamber is maintained at a pressure in a range of about 3 mTorr to about 12 mTorr.

2. The mass spectrometer of claim 1, wherein said tunable DC offset voltage is applied to increase the axial kinetic energy of said plurality of ions within a gas expansion zone of said third multipole ion guide.

3. The mass spectrometer of claim 1, wherein a diameter of said orifice is at least about 0.6 mm.

4. The mass spectrometer of claim 1, wherein said at least one tunable DC voltage source is configured to vary said applied tunable DC offset voltage in a range of about 0 to about 300 V;

optionally, wherein said tunable voltage source is configured to vary said applied tunable DC offset voltage in a range of about 0 to about 200 V.

5. The mass spectrometer of claim 1, wherein any of said first, said second, and said third multipole ion guides is maintained at a DC float voltage in a range of about −500 V to about 500 V.

6. The mass spectrometer of claim 5, wherein said at least one tunable DC voltage source comprises a first voltage source for applying said tunable DC offset voltage between said second ion guide and said second ion lens, and a second voltage source for applying said tunable DC offset voltage between said second ion lens and said third multipole ion guide.

7. The mass spectrometer of claim 1, further comprising one or more radiofrequency (RF) sources for applying RF voltage(s) to at least one of said first, said second and said third multipole ion guides for focusing said plurality of ions passing therethrough.

8. The mass spectrometer of claim 1, wherein a plurality of rods of at least one of said first, said second, and said third multipole ion guides are arranged in any of a quadrupole, a hexapole and a dodecapole configuration.

9. The mass spectrometer of claim 1, further comprising an ion source for generating the plurality of ions;

optionally, wherein said ion source comprises an atmospheric pressure ion source.

10. A method for mass spectrometric analysis of a sample using a mass spectrometer comprising an orifice plate, and a first chamber, a second chamber, and a third chamber disposed in tandem downstream of said orifice plate, wherein a first ion guide, a second ion guide, and a third ion guide are respectively positioned in said first, second, and third chambers and wherein a first ion lens is disposed between said first chamber and said second chamber and a second ion lens is disposed between said second chamber and said third chamber, said method comprising:

maintaining said first chamber at a pressure in a range of about 5 Torr to about 15 Torr, maintaining said second chamber at a pressure in a range of about 1 Torr to about 5 Torr, maintaining said third chamber at a pressure in a range of about 3 mTorr to about 12 mTorr, ionizing said sample so as to form a plurality of ions, receiving said plurality of ions through an orifice of said orifice plate, passing said plurality of ions through said three first, second, and third chambers, applying a DC offset voltage between said second ion guide and said second ion lens or between said second ion lens and said third multipole ion guide to increase an axial kinetic energy of said plurality of ions so as to cause at least one of declustering and fragmentation of at least some of said plurality of ions in said third chamber, and passing at least a portion of said plurality of ions from said third chamber to a mass filter downstream of said third chamber.

11. The method of claim 10, wherein said DC offset voltage is in a range of about 0 to about 200V.

12. The method of claim 10, wherein said plurality of ions comprise at least an adduction.

* * * * *